(12) United States Patent
Zhang et al.

(10) Patent No.: US 10,492,198 B2
(45) Date of Patent: Nov. 26, 2019

(54) UPLINK ACCESS METHOD, DEVICE, AND TERMINAL, AND BASE STATION

(71) Applicant: ZTE CORPORATION, Shenzhen (CN)

(72) Inventors: Shujuan Zhang, Shenzhen (CN); Wenhao Liu, Shenzhen (CN); Guanghui Yu, Shenzhen (CN)

(73) Assignee: ZTE CORPORATION, Shenzhen Guangdong (CN)

( * ) Notice: Subject to any disclaimer, the term of this patent is extended or adjusted under 35 U.S.C. 154(b) by 0 days.

(21) Appl. No.: 16/069,584

(22) PCT Filed: Aug. 10, 2016

(86) PCT No.: PCT/CN2016/094389
§ 371 (c)(1),
(2) Date: Jul. 12, 2018

(87) PCT Pub. No.: WO2017/121109
PCT Pub. Date: Jul. 20, 2017

(65) Prior Publication Data
US 2019/0021076 A1    Jan. 17, 2019

(30) Foreign Application Priority Data

Jan. 12, 2016  (CN) .......................... 2016 1 0018535

(51) Int. Cl.
*H04W 72/04*    (2009.01)
*H04W 48/08*    (2009.01)
(Continued)

(52) U.S. Cl.
CPC ......... *H04W 72/044* (2013.01); *H04L 1/1812* (2013.01); *H04W 48/08* (2013.01);
(Continued)

(58) Field of Classification Search
CPC ... H04W 48/08; H04W 48/14; H04W 72/044; H04W 74/004; H04W 74/006; H04W 74/04; H04W 72/04; H04W 28/26
See application file for complete search history.

(56) References Cited

U.S. PATENT DOCUMENTS

2004/0127225 A1* 7/2004 Qiu ....................... H04W 28/26
                                                              455/450
2010/0113038 A1   5/2010 Eskicioglu
(Continued)

FOREIGN PATENT DOCUMENTS

CN    101815344 A    8/2010
CN    102204352 A    9/2011
(Continued)

OTHER PUBLICATIONS

International Search Report in international application No. PCT/CN2016/094389, dated Oct. 27, 2016, 2 pgs.
(Continued)

*Primary Examiner* — Mewale A Ambaye
(74) *Attorney, Agent, or Firm* — Cantor Colburn LLP

(57) ABSTRACT

Disclosed are an uplink access method, device, and terminal and a base station. The method comprises: a terminal requests, according to obtained uplink access configuration information, uplink access to one or more first base stations; the terminal receives uplink access related information responded from the one or more first base stations, wherein the uplink access related information comprises downlink synchronization related information for performing downlink synchronization; and the terminal selects, according to the obtained uplink access related information, a first base station to perform uplink access. The technical solution of the present invention enables a terminal to accomplish downlink synchronization with one or more selected first base stations while accomplishing uplink access, and to
(Continued)

obtain some system messages of the first base stations to which the terminal is connected. In this way, there is no need for the one or more first base stations to periodically transmit synchronization signals and certain system messages, and consequently, system power consumption for transmitting a synchronization signal and a system message is greatly reduced, thereby saving system resources.

19 Claims, 25 Drawing Sheets

(51) Int. Cl.
*H04L 1/18* (2006.01)
*H04W 74/00* (2009.01)
*H04W 48/14* (2009.01)
*H04W 28/26* (2009.01)
*H04W 74/04* (2009.01)

(52) U.S. Cl.
CPC ......... *H04W 48/14* (2013.01); *H04W 74/004* (2013.01); *H04W 28/26* (2013.01); *H04W 72/04* (2013.01); *H04W 74/006* (2013.01); *H04W 74/04* (2013.01); *Y02D 70/00* (2018.01)

(56) References Cited

U.S. PATENT DOCUMENTS

| | | | |
|---|---|---|---|
| 2010/0124931 A1 | 5/2010 | Eskicioglu | |
| 2013/0188580 A1* | 7/2013 | Dinan | H04W 52/281 370/329 |
| 2015/0045045 A1 | 2/2015 | Eskicioglu | |
| 2016/0007310 A1 | 1/2016 | Yi et al. | |
| 2016/0100374 A1 | 4/2016 | Choi et al. | |
| 2016/0163760 A1* | 6/2016 | Tsai | H01L 27/14649 257/432 |
| 2016/0219475 A1* | 7/2016 | Kim | H04L 5/00 |

FOREIGN PATENT DOCUMENTS

| | | |
|---|---|---|
| CN | 102892198 A | 1/2013 |
| CN | 102907154 A | 1/2013 |
| CN | 103582085 A | 2/2014 |
| WO | 2014142628 A2 | 9/2014 |
| WO | 2014196748 A1 | 12/2014 |

OTHER PUBLICATIONS

English Translation of the Written Opinion of the International Search Authority in international application No. PCT/CN2016/094389, dated Oct. 27, 2016, 4 pgs.

\* cited by examiner

UPLINK ACCESS METHOD, DEVICE, AND TERMINAL, AND BASE STATION

TECHNICAL FIELD

Embodiments of the disclosure relate to, but not limited to, a mobile communication technology, and particularly to an uplink access method, a terminal and a base station.

BACKGROUND

Researches show that, in a related Long Term Evolution (LTE) system design, a resource utilization rate is relatively low, for example, an average resource utilization rate is 2%~20%. For a system signal such as a synchronization signal, a system broadcast message and a common reference signal, no matter whether there is a user presently residing in a cell or whether there is a user required to send and receive data or not, the system signal is periodically sent or each frame is sent, which may make a difference between power consumption of base stations with a light load (for example, a resource utilization rate is 2%) and a heavy load (for example, a resource utilization rate is 20%) not so great, that is, most of the power consumption of the base stations is occupied by sending of the system signal. Therefore, it is necessary to further consider optimization of sending of the system signal during LTE.

In a related LTE system, a synchronization signal and a system broadcast message are periodically sent. In a radio frame, the synchronization signal is sent every 5 ms, a first system broadcast message such as a Master Information Block (MIB) is periodically sent on a Physical Broadcast Channel (PBCH) every 10 ms, and another system broadcast message such as System Information Block (SIB) information is periodically sent. After downlink synchronization, a terminal acquires PBCH information and an SIB to further obtain uplink access configuration information and then sends an uplink access request preamble signal, and even though there is no terminal required to send data and receive data in a cell, a system may still periodically send the synchronization signal and the system broadcast message, which undoubtedly brings system power consumption and resource loss. For LTE, an existing on/off mechanism for a small cell only prolongs a Discover Reference Signal (DRS) period and may not send a DRS according to a requirement, which may also bring system power consumption and system resource loss.

Along with development of a communication technology, a data service demand keeps increasing, but available low-frequency carriers become very scarce. Therefore, communication based on high-frequency (30~300 GHz) carriers which have yet not been fully utilized becomes one of important communication means for future high-speed data communication. For high-frequency carrier-based communication, an available bandwidth is quite large, so that effective high-speed data communication may be provided. At the same time, high-frequency communication is also confronted with such a great technical challenge that a high-frequency communication signal, relative to a low-frequency signal, has great spatial fading and thus its outdoor communication quality is reduced. Because of wavelength reduction, more antennae may be used to perform beam-based communication to compensate spatial fading loss. But in such a manner, during high-frequency communication, a synchronization signal and a system message are sent to achieve a purpose of coverage and are required to be sent in each beam direction, and a manner of periodically sending the synchronization signal and a system broadcast message in a related technology undoubtedly increases system power consumption and system resources for sending the synchronization signal and the system message.

SUMMARY

The below is a summary about a theme described in the disclosure in detail. The summary is not intended to limit the scope of protection of the claims.

The embodiments of the disclosure provide an uplink access method and device, a terminal and a base station, which may greatly reduce system power consumption brought by sending of a synchronization signal and a system broadcast message and save system resources.

In a first aspect, the embodiments of the disclosure provide an uplink access method, which may include that: a terminal requests one or more first base stations for uplink access according to obtained uplink access configuration information;

uplink access related information returned from the one or more first base stations is received, the uplink access related information including downlink synchronization related information for downlink synchronization; and the first base station for uplink access is selected according to the received uplink access related information from among the one or more first base stations.

In an embodiment, when the terminal does not complete downlink synchronization with the first base station returning the uplink access related information according to the downlink synchronization related information in the returned uplink access related information, the method may further include that: the terminal completes downlink synchronization with the selected first base station.

In an embodiment, the method may further include that: before requesting, by the terminal, the one or more than one first base station for uplink access according to the obtained uplink access configuration information, the terminal obtains the uplink access configuration information according to a system broadcast message from a second base station; or the terminal obtains the uplink access configuration information according to high-layer configuration information from the second base station.

In an embodiment, when the terminal obtains the uplink access configuration information according to the system broadcast message from the second base station, the method may include:

the terminal receives a downlink synchronization signal and system message periodically sent by the second base station, completes downlink synchronization with the second base station and reads the system message sent by the second base station to obtain the uplink access configuration information.

In an embodiment, the uplink access configuration information may include one or more of the following information:

a first uplink access signal sequence set;

information about first uplink access signal sequence group;

information about second uplink access signal sequence group;

information about first carrier frequency for sending an uplink access request signal;

information about second carrier frequency or second carrier frequency set for receiving a first response signal;

time-domain resource information and/or frequency-domain resource information of a first available time-frequency resource set;

time-domain resource information and/or frequency-domain resource information of a second available time-frequency resource set; and a cell identifier set of one or more first base stations required to be monitored by the terminal.

In an embodiment, the operation that the terminal requests the one or more first base stations for uplink access according to the obtained uplink access configuration information may include that:

the terminal sends the uplink access request signal to the one or more first base stations on one or more first time-frequency resources of the first available time-frequency resource set.

In an embodiment, the operation that the uplink access request signal is sent to the one or more first base stations may include that:

the terminal sends a group of uplink access request signals on different uplink beams on the first time-frequency resources; and/or the terminal sends one or more groups of uplink access request signals on multiple groups of uplink beams in different time buckets, herein the uplink access request signals corresponding to intra-group beams occupying the same time-frequency resource may be different first sequences; or the intra-group beams occupying the same time-frequency resource may be divided into multiple clusters, different clusters of the same group may correspond to the same first sequence group and different second sequences, different beams in each cluster may correspond to different first sequences, and at this moment, the uplink access request signal sent on each beam may be a product sequence of the corresponding first sequence and second sequence, herein all the uplink access request signals corresponding to all the beams occupying the same time-frequency resource may form a group of uplink access request signals.

In an embodiment, the first sequence may be a Zadoff-Chu (ZC) sequence; and the second sequence may be a Gold sequence.

In an embodiment, the first sequences, or the first sequence groups or the first sequence groups and second sequence groups may be notified through the uplink access configuration information.

In an embodiment, the operation that the uplink access related information returned from the one or more first base stations is received may include that:

the terminal detects one or more first response signal sent by the one or more first base stations on one or more second time-frequency resources of the second available time-frequency resource set and carrying the uplink access related information, herein the first response signal may have a specific structure on the second time-frequency resource.

In an embodiment, the first response signal may carry one or more of the following information:

cell identification information of the first base station;

related information of an uplink access request signal group corresponding to the first response signal sent by the first base station;

information related to a preferred uplink sending beam from the terminal to the first base station;

a duration T1 from time of arrival of the uplink access request signals corresponding to the first response signal to starting of sending of the first response signal;

a difference value between the duration T1 from the time of arrival of the uplink access request signals corresponding to the first response signal to starting of sending of the first response signal and a predetermined duration T4;

a corresponding duration T1 for each uplink access request signal in the group of uplink access request signals corresponding to the first response signal;

one duration T1 for the group of uplink access request signals corresponding to the first response signal;

reception quality indication information of the uplink access request signals corresponding to the first response signal sent by the first base station;

a downlink system bandwidth of the first base station;

an uplink system bandwidth allocated to the terminal by the first base station;

downlink sending beam information of the first base station; and a related structural parameter of a Physical Hybrid Automatic Repeat Request (ARQ) Indicator Channel (PHICH).

In an embodiment, the first response signal may include a demodulation reference signal part.

In an embodiment, the first response signal may further include a Downlink Control Indication (DCI) part.

In an embodiment, the first response signal may further include a data part of the first response signal.

In an embodiment, a pattern relationship between a time-frequency resource occupied by a DCI and a time-frequency resource occupied by a demodulation reference signal on the second time-frequency resource may be agreed upon in advance by the first base station and the terminal; and the time-frequency resource occupied by the demodulation reference signal on the second time-frequency resource may be agreed upon in advance by the first base station and the terminal.

In an embodiment, the method may further include that:
after the demodulation reference signal is successfully detected, the terminal obtains the time-frequency resource occupied by the DCI according to the pattern relationship between the time-frequency resources occupied by the demodulation reference signal and the DCI;

the terminal decodes the DCI according to a transmission mode of the DCI, which is agreed upon in advance; and the terminal obtains a time-frequency resource occupied by the data part and a transmission mode according to the decoded DCI and further decodes the data part.

In an embodiment, the data part may occupy a resource within the second time-frequency resource or occupy a time-frequency resource beyond the second time-frequency resource.

In an embodiment, the demodulation reference signal may meet one of the following characteristics:

demodulation reference signals in the first response signals from different first base stations are in one-to-one correspondence with the cell identification information of the one or more first base stations, and at this moment, the terminal may obtain the cell identification information according to the demodulation reference signals; or the demodulation reference signals in the first response signals from different first base stations form a one-to-one correspondence with the cell identification information of the one or more first base stations and downlink sending beams of the first base stations, and at this moment, the terminal may obtain the cell identification information and the downlink sending beam information according to the demodulation reference signals.

In an embodiment, the method may further include that:

the terminal obtains a starting location of a transmission unit where the first response signal is located according to the demodulation reference signal in the first response signal received from the first base station, herein a time domain of a transmission unit may be equal to a time-domain length corresponding to a minimum resource scheduling unit, and a frequency domain of the transmission unit may correspond to an overall system bandwidth.

In an embodiment, the method may further include that:

the terminal completes downlink synchronization with the first base station within a larger time range according to index information, carried in the first response signal, of the transmission unit where the first response signal is located in longer time.

In an embodiment, the index information may be divided into two levels:

a first-level index information that is index information of the transmission unit in a first time unit, and a second-level index information that is index information of the first time unit where the transmission unit is located in a second time unit, herein the first time unit may include M1 transmission units, the second time unit may include M2 first time units, and both of M1 and M2 may be integers more than or equal to 1, and may be fixed values agreed upon in advance by the first base station and the terminal; and correspondingly, the first response signal may only carry the first-level index information, or the first response signal may carry the first-level index information and the second-level index information.

In an embodiment, for the group of uplink access request signals sent by the terminal on different uplink sending beams at the same time, the terminal may detect only one such first response signal on the second time-frequency resource, the first response signal carrying a list of intra-group uplink access request signals successfully received by the first base station and the reception quality indication information of each successfully received uplink access request signal or the first response signal carrying one intra-group uplink access request signal successfully received by the first base station and reception quality of the uplink access request signal.

In an embodiment, the uplink access request signal may be an uplink access request signal with highest reception quality among the intra-group uplink access request signals successfully received by the first base station.

In an embodiment, the first time-frequency resource may belong to the first available time-frequency resource set, and the time-frequency resource may be a time-frequency resource corresponding to a first carrier frequency by which the terminal sends the uplink access request signal; and the second time-frequency resource may belong to the second available time-frequency resource set, and the time-frequency resource may be a time-frequency resource corresponding to a second carrier frequency or each carrier frequency in a second carrier frequency set by which the terminal receives the first response signal.

In an embodiment, the first available time-frequency resource set may meet one of the following characteristics:

a frequency domain occupied by the first available time-frequency resource is fixedly a frequency band having a fixed distance from a central location of the first carrier frequency, and a time domain occupied by the first time-frequency resource is all of a time bucket of the frequency band; or the frequency domain occupied by the first available time-frequency resource is fixedly the frequency band having the fixed distance from the central location of the first carrier frequency, the time domain occupied by the first time-frequency resource is a part of the time bucket of the frequency band, and here, the part of the time bucket is obtained through the uplink access configuration information; or a time-domain location and frequency-domain location of the first available time-frequency resource are obtained through the uplink access configuration information.

In an embodiment, the second available time-frequency resource may meet one of the following characteristics:

a frequency domain occupied by the second time-frequency resource is fixedly a frequency band having a fixed distance from a central location of the second carrier frequency or each carrier frequency in the second carrier frequency set, and a time domain occupied by the second time-frequency resource is all of a time bucket of the frequency band; or the frequency domain occupied by the second time-frequency resource is fixedly the frequency band having the fixed distance from the central location of the second carrier frequency or each carrier frequency in the second carrier frequency set, the time domain occupied by the second time-frequency resource is part of the time bucket of the frequency band, and here, the part of the time bucket may be obtained through the uplink access configuration information; or a time-domain location and frequency-domain location of the second time-frequency resource are obtained through the uplink access configuration information.

In an embodiment, the operation that the first base station for uplink access is selected according to the received uplink access related information from among the one or more first base stations may include that:

the terminal selects the first base station for uplink access from the one or more first base stations from which the first response signals are successfully received; and the terminal obtains downlink timing with the first base station for uplink access according to the first response signal sent by the selected first base station, obtains Time Advance (TA) information of starting time of an uplink transmission unit to the selected first base station relative to a corresponding downlink transmission unit, obtains the preferred uplink sending beam arriving at the selected first base station and obtains information about a preferred downlink beam from the selected first base station to the terminal.

In an embodiment, the TA information may be as follows:

the terminal obtains TA of a starting location of the uplink transmission unit between the terminal and the first base station corresponding to the first response signal relative to a starting location of the corresponding downlink transmission unit between the terminal and the first base station according to information of the duration T1 from the time of arrival of the uplink access request signals corresponding to the first response signal to starting of sending of the first response signal or the corresponding duration T1 for each uplink access request signal in the uplink access request signal group corresponding to the first response signal, uplink access request signal information carried in the first response signal and a duration T3 from starting time when the terminal sends the uplink access request signal to time of arrival of the first response signal corresponding to the uplink access request signal.

In an embodiment, the method may further include that: the terminal sends a second response signal to the selected first base station on one or more uplink sending beams, herein the one or more uplink sending beams may be obtained on the basis of the information about the preferred uplink sending beam carried in the first response signal sent by the selected first base station; and the terminal monitors a third response signal sent by the selected first base station on the preferred downlink beam, herein the preferred downlink beam may be obtained according to the first response signal of the first base station, and may be fed back to the selected first base station in the second response signal.

In an embodiment, the second response signal may carry one or more of the following information:

the cell identification information of the selected first base station;

the information about the preferred downlink sending beam from the selected first base station to the terminal;

identification information of the terminal; and information about the uplink sending beam by which the terminal sends the second response signal.

In an embodiment, the third response signal may carry one or more of the following information:

related indication information indicating completion of sending and receiving signals associated with uplink access and downlink synchronization between the terminal and the selected first base station;

the identification information of the terminal;

the information about the preferred uplink sending beam from the terminal to the selected first base station; and index information of a first time unit where the third response signal is located in a second time unit.

In an embodiment, the method may further include that: the terminal sends the second response signal to the selected first base station on a third time-frequency resource; and the terminal monitors the third response signal sent by the selected first base station on a preferred downlink beam of a fourth time-frequency resource.

In an embodiment, the third time-frequency resource and the fourth time-frequency resource may be obtained by adopting the following one or more manners:

obtaining through the uplink access configuration information; and obtaining through the first response signal sent by the selected first base station.

In an embodiment, the third response signal may carry one or more of the following information:

related indication information indicating completion of sending and receiving signals associated with uplink access and downlink synchronization between the terminal and the selected first base station;

the identification information of the terminal;

the information about the preferred uplink sending beam from the terminal to the selected first base station;

the index information of the first time unit where the third response signal is located in the second time unit;

the downlink system bandwidth of the first base station;

the uplink system bandwidth allocated to the terminal by the first base station; and the related structural parameter of the PHICH.

In an embodiment, after the operation that the terminal successfully receives the third response signal sent by the selected first base station, the method may further include that:

the terminal receives second uplink access configuration information from the selected first base station as uplink access configuration information configured for a next uplink access of the terminal to the selected first base station.

In an embodiment, the selected first base station may send the second uplink access configuration information through a downlink data channel or a system message.

In an embodiment, after the operation that the terminal successfully receives the third response signal sent by the selected first base station, the method may further include that:

third uplink access configuration information is received from the selected first base station as uplink access configuration information configured for an uplink access of the terminal to a fourth base station.

In an embodiment, the selected first base station may send the third uplink access configuration information through the downlink data channel or the system message.

In a second aspect, the embodiments of the disclosure further provide an uplink access method, which may include that: a first base station receives an uplink access request from a terminal, and feeds back uplink access related information to the terminal, the uplink access related information including downlink synchronization related information for downlink synchronization; and a selected first base station in first base stations implements uplink access with the terminal.

In an embodiment, the method may further include that: the first base station monitors an uplink access request signal set on a first available time-frequency resource set; and the operation that the first base station receives the uplink access request from the terminal and feeds back the uplink access related information to the terminal may include that:

after an uplink access request signal or part of signals in an uplink access request signal group are successfully detected, the first base station sends a first response signal corresponding to the uplink access request signal or the uplink access request signal group at a starting location of a downlink transmission unit in a second available time-frequency resource set.

In an embodiment, before the operation that the first base station monitors the uplink access request signal set on the first available time-frequency resource set, the method may further include that: the first base station receives uplink access configuration information.

In an embodiment, the uplink access configuration information may be obtained in one or more of the following manners:

the first base station obtains the uplink access configuration information according to a system message from a second base station; or the first base station obtains the uplink access configuration information according to high-layer configuration information from the second base station.

In an embodiment, the uplink access configuration information may include one or more of the following information:

a first uplink access signal sequence set;

information about first uplink access signal sequence group;

first carrier frequency information for sending the uplink access request signals;

second carrier frequency or second carrier frequency set information for receiving the first response signal;

time-domain resource information and/or frequency-domain resource information of the first available time-frequency resource set; and time-domain resource information and/or frequency-domain resource information of the second available time-frequency resource set.

In an embodiment, the uplink access request signal may meet one of the following characteristics:

one such uplink access request signal corresponds to a first sequence; and one such uplink access request signal corresponds to a product sequence of a first sequence and a second sequence.

In an embodiment, the first sequence and the second sequence may be obtained through the uplink access configuration information.

In an embodiment, the first response signal may carry one or more of the following information:

cell identification information of the first base station;

related information of the uplink access request signal group corresponding to the first response signal sent by the first base station;

information related to a preferred uplink sending beam from the terminal to the first base station;

a duration T1 from time of arrival of a uplink access request signal corresponding to the first response signal to starting of sending of the first response signal;

a difference value between the duration T1 from the time of arrival of the uplink access request signal corresponding to the first response signal to starting of sending of the first response signal and a predetermined duration T4;

a corresponding duration T1 for each uplink access request signal in the group of uplink access request signals corresponding to the first response signal;

one duration T1 for the group of uplink access request signals corresponding to the first response signal;

reception quality indication information of the uplink access request signals corresponding to the first response signal sent by the first base station;

a downlink system bandwidth of the first base station;

an uplink system bandwidth allocated to the terminal by the first base station;

downlink sending beam information of the first base station; and a related structural parameter of a PHICH.

In an embodiment, the operation that the selected first base station in the first base stations implements uplink access with the terminal may include that:

the first base station monitors a second response signal from the terminal; and after the second response signal is successfully received from the terminal, the first base station compares whether cell identification information carried in the second response signal is the same as its cell identification information or not, and when they are the same and the base station allows access of the terminal, the first base station is determined as the selected first base station and sends a third response signal to the terminal on a preferred downlink beam, herein the preferred downlink beam may be obtained according to the second response signal.

In an embodiment, when the first base station simultaneously receives second response signals of multiple terminals, cell identification information carried in the second response signals of the multiple terminals is the cell identification information of the first base station and the second response signals of the multiple terminals carry the same preferred downlink beam, the first base station may select to send the third response signal to one terminal.

In an embodiment, the third response signal may carry one or more of the following information:

related indication information indicating completion of sending and receiving signals associated with uplink access and downlink synchronization between the terminal and the selected first base station;

identification information of the terminal;

the information about the preferred uplink sending beam from the terminal to the selected first base station; and index information of a first time unit where the third response signal is located in a second time unit.

In an embodiment, the method may further include that:

the first base station carries a third time-frequency resource and a fourth time-frequency resource in the uplink access configuration information or the first response signal; and the first base station monitors the second response signal on the third time-frequency resource and sends a fourth response signal on the fourth time-frequency resource, herein the third response signal may carry one or more of the following information:

related indication information indicating completion of sending and receiving signals associated with uplink access and downlink synchronization between the terminal and the selected first base station;

the identification information of the terminal;

the information about the preferred uplink sending beam from the terminal to the selected first base station;

the index information of the first time unit where the third response signal is located in the second time unit;

the downlink system bandwidth of the first base station;

the uplink system bandwidth allocated to the terminal by the first base station; and the related structural parameter of the PHICH.

In an embodiment, after the operation that the selected first base station sends a third response to the terminal, the method may further include that:

the selected first base station sends second uplink access configuration information to the terminal as uplink access configuration information for a next uplink access of the terminal to the selected first base station.

In an embodiment, after the operation that the selected first base station sends the third response to the terminal, the method may further include that:

the selected first base station sends third uplink access configuration information to the terminal and a fourth base station as uplink access configuration information for an uplink access of the terminal to the fourth base station.

In an embodiment, the second uplink access configuration information or the third uplink access configuration information may be sent through a downlink data channel or a system message.

In a third aspect, the embodiments of the disclosure further provide an uplink access device, which may include: a first processing module and a second processing module, herein the first processing module may be configured to request one or more first base stations for uplink access according to obtained uplink access configuration information and receive uplink access related information returned from the one or more first base stations, the uplink access related information including downlink synchronization related information for downlink synchronization; and the second processing module may be configured to select the first base station for uplink access according to the received uplink access related information.

In an embodiment, when a terminal does not complete downlink synchronization with the first base station returning the uplink access related information according to the downlink synchronization related information in the returned uplink access related information, the second processing module may further be configured to complete downlink synchronization with the selected first base station.

In an embodiment, the device may further include a first acquisition module, configured to obtain the uplink access configuration information according to a system broadcast message from a second base station or obtain the uplink access configuration information according to high-layer configuration information from the second base station.

In an embodiment, the first processing module may specifically be configured to: send an uplink access request signal indicated by the uplink access configuration information to one or more first base stations on one or more first time-frequency resources of a first available time-frequency resource set indicated by the uplink access configuration information and detect (a) first response signal(s) sent by the one or more first base stations and carrying the uplink access related information on one or more second time-frequency resources of a second available time-frequency resource set indicated by the uplink access configuration information; and the first response signal may have a specific structure on the second time-frequency resource.

In an embodiment, the operation that the first processing module sends the uplink access request signal to the one or more first base stations on the first time-frequency resources may include:

sending a group of uplink access request signals on different uplink beams on the first time-frequency resources; and/or, sending one or more groups of uplink access request signals on multiple groups of uplink beams in different time buckets, herein the uplink access request signals corresponding to intra-group beams occupying the same time-frequency resource may be different first sequences; or the intra-group beams occupying the same time-frequency resource may be divided into multiple clusters, different clusters of the same group may correspond to the same first sequence group and different second sequences, different beams in each cluster may correspond to different first sequences, and at this moment, the uplink access request signal sent on each beam may be a product sequence of the corresponding first sequence and second sequence, herein all the uplink access request signals corresponding to all the beams occupying the same time-frequency resource may form a group of uplink access request signals.

In an embodiment, a pattern relationship between a time-frequency resource occupied by a DCI and a time-frequency resource occupied by a demodulation reference signal on the second time-frequency resource may be agreed upon in advance by the first base station and the terminal; and the time-frequency resource occupied by the demodulation reference signal on the second time-frequency resource may be agreed upon in advance by the first base station and the terminal.

In an embodiment, the first processing module may further be configured to: complete downlink synchronization with the first base station within a larger time range according to index information, carried in the first response signal, of a transmission unit where the first response signal is located in longer time.

In an embodiment, the index information may be divided into two levels, herein the first-level index information may be index information of the transmission unit in a first time unit, and the second-level index information may be index information of the first time unit where the transmission unit is located in a second time unit, herein the first time unit may include M1 transmission units, the second time unit may include M2 first time units, and both of M1 and M2 may be integers more than or equal to 1, and may be fixed values agreed upon in advance by the first base station and the terminal; and correspondingly, the first response signal may only carry the first-level index information, or the first response signal may carry the first-level index information and the second-level index information.

In an embodiment, the second processing module may specifically be configured to:

select the first base station for uplink access from the one or more first base stations from which the first response signals are successfully received;

obtain downlink timing with the first base station for uplink access according to the first response signal sent by the selected first base station, obtain TA information of starting time of an uplink transmission unit to the selected first base station relative to a corresponding downlink transmission unit, obtain information about a preferred uplink sending beam arriving at the selected first base station and obtain information about a preferred downlink beam from the selected first base station to the terminal; and send a second response signal to the selected first base station on one or more uplink sending beams.

In an embodiment, the TA information may be as follows: the terminal obtains TA of a starting location of the uplink transmission unit between the terminal and the first base station corresponding to the first response signal relative to a starting location of the corresponding downlink transmission unit between the terminal and the first base station according to information of a duration T1 from time of arrival of the uplink access request signals corresponding to the first response signal to starting of sending of the first response signal in the first response signal or a corresponding duration T1 for each uplink access request signal in the uplink access request signal group corresponding to the first response signal, uplink access request signal information carried in the first response signal and a duration T3 from starting time when the terminal sends the uplink access request signal to time of arrival of the first response signal corresponding to the uplink access request signal.

In an embodiment, when a third response signal sent by the selected first base station is successfully received, the second processing module may further be configured to:

receive second uplink access configuration information from the selected first base station as uplink access configuration information configured for a next uplink access of the terminal where the second processing module is located to the selected first base station.

In an embodiment, the selected first base station may send the second uplink access configuration information through a downlink data channel or a system message.

In an embodiment, when the third response signal sent by the selected first base station is successfully received, the second processing module may further be configured to:

receive third uplink access configuration information from the selected first base station as uplink access configuration information configured for an uplink access of the terminal where the second processing module is located to a fourth base station.

In an embodiment, the selected first base station may send the third uplink access configuration information through the downlink data channel or the system message.

In a fourth aspect, the embodiments of the disclosure further provide a terminal, which may include any uplink access device provided by the third aspect.

In a fifth aspect, the embodiments of the disclosure further provide an uplink access device, which may include: a first response module and a second response module, herein the first response module may be configured to receive an uplink access request from a terminal and feed back uplink access related information to the terminal, the uplink access related information including downlink synchronization related information for downlink synchronization; and the second response module may be configured to, responsive to determination of a base station where it is located as a selected first base station, implement uplink access with the terminal.

In an embodiment, the device may further include a second acquisition module, configured to obtain uplink access configuration information according to a system message from a second base station or obtain the uplink access configuration information according to high-layer configuration information from the second base station.

In an embodiment, the first response module may specifically be configured to:

monitor an uplink access request signal set indicated by the uplink access configuration information on a first available time-frequency resource set indicated by the uplink access configuration information; and after an uplink access request signal or part of sequences in an uplink access request signal group are successfully detected, send a first response signal corresponding to the uplink access request signal or the uplink access request signal group and carrying the uplink access related information at a starting location of a downlink transmission unit in a second available time-frequency resource set indicated by the uplink access configuration information.

In an embodiment, the second response module may specifically be configured to:

monitor a second response signal from the terminal; and after the second response signal is successfully received from the terminal, compare whether cell identification information carried in the second response signal is the same as its cell identification information or not, and when they are the same and the base station allows access of the terminal, determine the base station where the second response module is located as the selected first base station and send a third response signal to the terminal on a preferred downlink beam, herein the preferred downlink beam may be obtained according to the second response signal.

In an embodiment, when the first base station simultaneously receives second response signals of multiple terminals, cell identification information carried in the second response signals of the multiple terminals is the cell identification information of the first base station and the second response signals of the multiple terminals carry the same preferred downlink beam, the second response module may further be configured to select, by the base station, to send the third response signal to one terminal.

In an embodiment, the third response signal may carry one or more of the following information:

related indication information indicating completion of sending and receiving signals associated with uplink access and downlink synchronization between the terminal and the selected first base station;

identification information of the terminal;

information about a preferred uplink sending beam from the terminal to the selected first base station; and index information of a first time unit where the third response signal is located in a second time unit.

In an embodiment, the third response signal may carry one or more of the following information;

related indication information indicating completion of sending and receiving signals associated with uplink access and downlink synchronization between the terminal and the selected first base station;

the identification information of the terminal;

the information about the preferred uplink sending beam from the terminal to the selected first base station;

the index information of the first time unit where the third response signal is located in the second time unit;

a downlink system bandwidth of the first base station;

an uplink system bandwidth allocated to the terminal by the first base station; and a related structural parameter of a PHICH.

In an embodiment, after the selected first base station sends a third response to the terminal, the second response module may further be configured to:

send second uplink access configuration information to the terminal as uplink access configuration information for a next uplink access of the terminal to the selected first base station.

In an embodiment, after the selected first base station sends the third response to the terminal, the second response module may further be configured to:

send third uplink access configuration information to the terminal and a fourth base station as uplink access configuration information for an uplink access of the terminal to the fourth base station.

In an embodiment, the second uplink access configuration information or the third uplink access configuration information may be sent through a downlink data channel or a system message.

In a sixth aspect, the embodiments of the disclosure further provide a base station, which may include any uplink access device of the first aspect.

In a seventh aspect, the embodiments of the disclosure further provide a computer-readable storage medium, which may store a computer-executable instruction, the computer-executable instruction being configured to execute any abovementioned uplink access method.

The technical solutions of the application include that: the terminal requests the one or more first base stations for uplink access according to the obtained uplink access configuration information; the uplink access related information returned from the one or more first base stations is received, the uplink access related information including the downlink synchronization related information for downlink synchronization; and the first base station for uplink access is selected according to the received uplink access related information from among the one or more first base stations. In the technical solutions provided by the disclosure, the one or more first base stations send downlink synchronization signals and part of system messages on the basis of the uplink access request of the terminal, thereby enabling the terminal to complete downlink synchronization with one or more selected first base stations at the same time of completing uplink access and obtain part of the system message of the accessed first base station. In such a manner, the one or more first base stations are not required to periodically send the synchronization signals and part of the system messages, so that system power consumption brought by sending of a synchronization signal and a system broadcast message is greatly reduced, and system resources are saved.

In an embodiment, in the uplink access solutions provided by the embodiments of the disclosure, recognition of an optimal uplink sending signal and recognition of an optimal downlink sending beam are implemented. Particularly, the uplink access request signals are grouped, then the terminal sends different uplink access request signals on a group of different sending beams, and the first base station feeds back only one first response signal for a group of uplink access request signals and optimizes confirmation of the preferred uplink beam, so that preference of the uplink beam is implemented.

Other characteristics and advantages of the embodiments of the disclosure will be elaborated in the following specification, and moreover, partially become apparent from the specification or are understood by implementing the disclosure. Purposes and other advantages of the disclosure may be achieved and obtained through structures specially pointed out in the specification, the claims and the drawings.

After the drawings and detailed descriptions are read and understood, the other aspects may be comprehended.

BRIEF DESCRIPTION OF DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

In order to make the purposes, technical solutions and advantages of the disclosure clearer, the embodiments of the disclosure will be described below in combination with the drawings in detail. It is important to note that the embodiments in the application and characteristics in the embodiments may be freely combined without conflicts.

Figure 1:
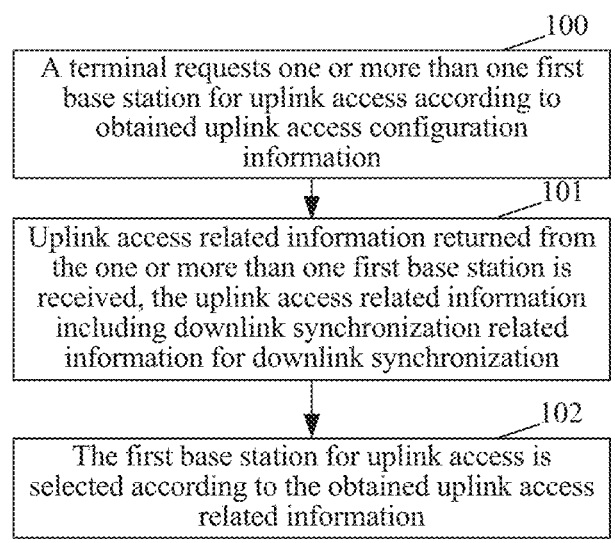
FIG. 1 is a flowchart of an implementation mode of an uplink access method according to an embodiment of the disclosure.

FIG. 1 is a flowchart of an implementation mode of an uplink access method according to an embodiment of the disclosure. As shown in FIG. 1, the method includes the following actions.

In 100, a terminal requests one or more first base stations for uplink access according to obtained uplink access configuration information.

Before the action, the method further includes that:

the terminal obtains the uplink access configuration information according to a system broadcast message from a second base station, specifically: the terminal receives a downlink synchronization signal and system message periodically sent by the second base station, completes downlink synchronization with the second base station and reads the system message sent by the second base station to obtain the uplink access configuration information configured for an uplink access process; or the terminal obtains the uplink access configuration information according to high-layer configuration information from the second base station.

Herein, the uplink access configuration information includes one or more of the following information:

a first uplink access signal sequence set;

information about first uplink access signal sequence group;

information about second uplink access signal sequence group;

information about first carrier frequency for sending an uplink access request signal;

information about second carrier frequency or second carrier frequency set for receiving a first response signal;

time-domain resource information and/or frequency-domain resource information of a first available time-frequency resource set;

time-domain resource information and/or frequency-domain resource information of a second available time-frequency resource set; and a cell identifier set of one or more first base stations required to be monitored by the terminal.

The operation that the terminal requests the one or more first base stations for uplink access according to the obtained uplink access configuration information in the action includes that: the terminal sends the uplink access request signal to the one or more first base stations on one or more first time-frequency resources of the first available time-frequency resource set, specifically including that:

the terminal sends a group of uplink access request signals on different uplink beams on the first time-frequency resources; and/or the terminal sends one or more groups of uplink access request signals on multiple groups of uplink beams in different time buckets, herein the uplink access request signals corresponding to intra-group beams occupying the same time-frequency resource are different first sequences; or the intra-group beams occupying the same time-frequency resource are divided into multiple clusters, different clusters of the same group correspond to the same first sequence group and different second sequences, different beams in each cluster correspond to different first sequences, and at this moment, the uplink access request signal sent on each beam is a product sequence of the corresponding first sequence and second sequence, herein all the uplink access request signals corresponding to all the beams occupying the same time-frequency resource form a group of uplink access request signals.

Herein, the first sequences, or the first sequence groups or the first sequence groups and second sequence groups are notified through the uplink access configuration information.

Preferably, the first sequence may be a ZC sequence; and the second sequence may be a Gold sequence.

Here, for example, the uplink access request signal is a Preamble sequence, the first sequence is a ZC sequence and the second sequence is a Pseudo-Noise (PN) sequence: the Preamble sequence sent on a beam is a product sequence of the ZC sequence and the PN sequence, called as a PreamblePN sequence for short, that is, $PreamblePN_{i,j,m}(n) = Preamble_{i,m}(n) * PN_{i,j}(n)$;
or $PreamblePN_{i,j,m}(n) = Preamble_{i,m}(n) * PN_{i,m}(n)$, where $PreamblePN_{i,j,m}$ represents a sequence signal sent on an mth beam in a jth cluster in an ith beam group. At this moment, the uplink access configuration information may notify a Preamble sequence group only, and a PN sequence group is obtained through cell identification information, notified in the uplink access configuration information, of the one or more first base stations; or the uplink access configuration information may also notify the Preamble sequence group only, and the PN sequence group is the same for all groups; or the uplink access configuration information may also notify information about both of the Preamble sequence group and the PN sequence group.

When a first carrier frequency is the same as a second carrier frequency, the uplink access configuration information only carries one of the two carrier frequencies;

when the first carrier frequency and the second carrier frequency form a one-to-one correspondence, the uplink access configuration information only carries one of the two carrier frequencies; and when time-frequency resources in the first available time-frequency resource set form a one-to-one correspondence with time-frequency resources of the second available time-frequency resource set, the uplink access configuration information only notifies the time-frequency resources in the first available time-frequency resource set or only notifies the time-frequency resources in the second available time-frequency resource set.

In 101, uplink access related information returned from the one or more first base stations is received, the uplink access related information including downlink synchronization related information for downlink synchronization.

In the action, the terminal may complete downlink synchronization with multiple first base stations returning uplink access related information.

The action specifically includes that: the terminal detects one or more first response signals sent by the one or more first base stations on one or more second time-frequency resources of the second available time-frequency resource set and carrying the uplink access related information, the first response signal having a specific structure on the second time-frequency resource.

Herein the first response signal carries one or more of the following information:

cell identification information of the first base station;

related information of an uplink access request signal group corresponding to the first response signal sent by the first base station;

information related to a preferred uplink sending beam from the terminal to the first base station;

a duration T1 from time of arrival of the uplink access request signals corresponding to the first response signal to starting of sending of the first response signal;

a difference value between the duration T1 from the time of arrival of the uplink access request signals corresponding to the first response signal to starting of sending of the first response signal and a predetermined duration T4;

a corresponding duration T1 for each uplink access request signal in the uplink access request signal group corresponding to the first response signal;

one duration T1 for the group of uplink access request signals corresponding to the first response signal (the duration T1 is a duration from time 1 to sending of the first response signal, the time 1 is a function about the time of arrival of all the uplink access request signals in the group, and the specific function is an implementation problem of the base station and not intended to limit the scope of protection of the disclosure);

reception quality indication information of the uplink access request signals corresponding to the first response signal sent by the first base station;

a downlink system bandwidth of the first base station;

an uplink system bandwidth allocated to the terminal by the first base station;

downlink sending beam information of the first base station; and a related structural parameter of a PHICH.

Herein the first response signal includes one or more of the following three parts: a demodulation reference signal part, further includes a DCI part and, furthermore, includes a data part of the first response signal, herein a channel value obtained by a demodulation reference signal may be configured to demodulate a DCI and the data part.

Herein a pattern relationship between a time-frequency resource occupied by the DCI and a time-frequency resource occupied by the demodulation reference signal on the second time-frequency resource is agreed upon in advance by the first base station and the terminal. The time-frequency resource occupied by the demodulation reference signal is agreed upon in advance by the first base station and the terminal, that is, the terminal knows about the specific location where the demodulation reference signal is received.

After the demodulation reference signal is successfully detected, the terminal obtains the time-frequency resource occupied by the DCI according to the pattern relationship between the time-frequency resources occupied by the demodulation reference signal and the DCI;

the terminal decodes the DCI according to a transmission mode of the DCI, which is agreed upon in advance; and the terminal obtains a time-frequency resource occupied by the data part and a transmission mode according to the decoded DCI and further decodes the data part.

Preferably, the data part may occupy a resource within the second time-frequency resource or occupy a time-frequency resource beyond the second time-frequency resource. A time-frequency resource in a system bandwidth range where the time-frequency resource of the data part is located forms a fixed pattern relationship with the time-frequency resource occupied by the DCI or the time-frequency resource occupied by the demodulation reference signal.

Herein the demodulation reference signal may meet one of the following characteristics: demodulation reference signals in the first response signals from different first base stations are in one-to-one correspondence with the cell identification information of the one or more first base stations, and at this moment, the terminal obtains the cell identification information according to the demodulation reference signals; or the demodulation reference signals in the first response signals from different first base stations form a one-to-one correspondence with the cell identification information of the one or more first base stations and downlink sending beams of the first base stations, and at this moment, the terminal obtains the cell identification information and the downlink sending beam information according to the demodulation reference signals.

In the action, the terminal obtains a starting location of a transmission unit where the first response signal is located according to the demodulation reference signal in the first response signal received from the first base station.

The terminal completes downlink synchronization with the first base station within a larger time range according to index information, carried in the first response signal, of the transmission unit where the first response signal is located in longer time, herein the index information is divided into two levels, herein the first-level index information is index information of the transmission unit in a first time unit such as a radio frame, and the second-level index information is index information such as radio system frame number information of the first time unit where the transmission unit is located in a second time unit, herein the first time unit includes M1 transmission units, the second time unit includes M2 first time units, and both of M1 and M2 are integers more than or equal to 1, and are fixed values agreed upon in advance by the first base station and the terminal. Correspondingly, the first response signal only carries the first-level index information, or the first response signal carries the first-level index information and the second-level index information, herein a time domain of a transmission unit is equal to a time-domain length corresponding to a minimum resource scheduling unit, and a frequency domain of the transmission unit corresponds to an overall system bandwidth.

In the action, for the condition that the terminal sends the uplink access request signals on a group of different uplink sending beams of the same time-frequency resource, the terminal detects only one such first response signal on the second time-frequency resource, the first response signal carrying a list of intra-group uplink access request signals successfully received by the first base station and the reception quality indication information of each successfully received uplink access request signal or the first response signal carrying one intra-group uplink access request signal successfully received by the first base station and reception quality of the uplink access request signal.

Preferably, the uplink access request signal is an uplink access request signal with highest reception quality among the intra-group uplink access request signals successfully received by the first base station.

Herein, the first time-frequency resource belongs to the first available time-frequency resource set, and the time-frequency resource is a time-frequency resource corresponding to the first carrier frequency by which the terminal sends the uplink access request signal; and the second time-frequency resource belongs to the second available time-frequency resource set, and the time-frequency resource is a time-frequency resource corresponding to the second carrier frequency or each carrier frequency in a second carrier frequency set by which the terminal receives the first response signal.

Herein, the first available time-frequency resource set meets one of the following characteristics:

a frequency domain occupied by the first available time-frequency resource is fixedly a frequency band having a fixed distance from a central location of the first carrier frequency, and a time domain occupied by the first time-frequency resource is all of a time bucket of the frequency band; or the frequency domain occupied by the first available time-frequency resource is fixedly the frequency band having the fixed distance from the central location of the first carrier frequency, the time domain occupied by the first time-frequency resource is a part of the time bucket of the frequency band, and here, the part of the time bucket is obtained through the uplink access configuration information; or a time-domain location and frequency-domain location of the first available time-frequency resource are obtained through the uplink access configuration information.

Herein, the second available time-frequency resource meets one of the following characteristics:

a frequency domain occupied by the second time-frequency resource is fixedly a frequency band having a fixed distance from a central location of the second carrier frequency or each carrier frequency in the second carrier frequency set, and a time domain occupied by the second time-frequency resource is all of a time bucket of the frequency band; or the frequency domain occupied by the second time-frequency resource is fixedly the frequency band having the fixed distance from the central location of the second carrier frequency or each carrier frequency in the second carrier frequency set, the time domain occupied by the second time-frequency resource is part of the time bucket of the frequency band, and here, the part of the time bucket may be obtained through the uplink access configuration information; or a time-domain location and frequency-domain location of the second time-frequency resource are obtained through the uplink access configuration information.

In 102, the terminal selects the first base station for uplink access according to the received uplink access related information.

If the terminal does not complete downlink synchronization with the first base station returning the uplink access related information according to the downlink synchronization related information in the returned uplink access related information in 101, the action further includes that: the terminal completes downlink synchronization with the selected first base station.

In the action, the terminal obtains a starting location for sending the uplink signal to the first base station according to the following information: the terminal obtains TA of a starting location of an uplink transmission unit between the terminal and the first base station corresponding to the first response signal relative to a starting location of a corresponding downlink transmission unit between the terminal and the first base station according to information of the duration T1 from the time of arrival of the uplink access request signals corresponding to the first response signal to starting of sending of the first response signal in the first response signal (or if the first response signal corresponds to an uplink access request signal group, each uplink access request signal in the uplink access request signal group is required to be fed back for the corresponding duration T1), the uplink access request signal carried in the first response signal and a duration T3 from starting time when the terminal sends the uplink access request signal to time of arrival of the first response signal corresponding to the uplink access request signal.

After the operation that the terminal successfully receives the first response signal(s) from the one or more first base stations, the action specifically includes that:

the terminal selects the first base station for uplink access from the one or more first base stations from which the first response signals are successfully received; and the terminal obtains downlink timing with the first base station for uplink access, with which uncompleted downlink synchronization is continued, according to the first response signal sent by the selected first base station, obtains TA information of starting time of the uplink transmission unit to the selected first base station relative to the corresponding downlink transmission unit, obtains the preferred uplink sending beam arriving at the selected first base station and obtains information about a preferred downlink beam from the selected first base station to the terminal.

The action further includes that: the terminal sends a second response signal to the selected first base station on one or more uplink sending beams, herein the one or more uplink sending beams are obtained on the basis of the information about the preferred uplink sending beam carried in the first response signal sent by the selected first base station; and the terminal monitors a third response signal sent by the selected first base station on the preferred downlink beam, herein the preferred downlink beam is obtained according to the first response signal of the selected first base station, and is fed back to the selected first base station in the second response signal.

herein, the second response signal carries one or more of the following information:

the cell identification information of the selected first base station;

the information about the preferred downlink sending beam from the selected first base station to the terminal;

identification information of the terminal; and information about the uplink sending beam by which the terminal sends the second response signal.

Herein, the third response signal carries one or more of the following information:

related indication information indicating completion of sending and receiving signals associated with uplink access and downlink synchronization between the terminal and the selected first base station;

the identification information of the terminal;

the information about the preferred uplink sending beam from the terminal to the selected first base station; and index information of a first time unit where the third response signal is located in a second time unit, for example, system frame number information of a radio frame.

Or, the action further includes that: the terminal sends the second response signal to the selected first base station on a third time-frequency resource; and the terminal monitors the third response signal sent by the selected first base station on a preferred downlink beam of a fourth time-frequency resource, herein the third time-frequency resource and the fourth time-frequency resource may be obtained by adopting the following one or more manners: obtaining through the uplink access configuration information; and/or obtaining through the first response signal sent by the selected first base station. At this moment, the third response signal carries one or more of the following information:

related indication information indicating completion of sending and receiving signals associated with uplink access and downlink synchronization between the terminal and the selected first base station;

the identification information of the terminal;

the information about the preferred uplink sending beam from the terminal to the selected first base station;

the index information of the first time unit where the third response signal is located in the second time unit;

the downlink system bandwidth of the first base station;

the uplink system bandwidth allocated to the terminal by the first base station; and the related structural parameter of the PHICH.

After the operation that the terminal successfully receives the third response signal sent by the selected first base station, the method of the disclosure further includes that:

the terminal receives second uplink access configuration information from the selected first base station as uplink access configuration information configured for a next uplink access of the terminal to the selected first base station. Preferably, the selected first base station sends the second uplink access configuration information through a downlink data channel or a system message.

After the operation that the terminal successfully receives the third response signal sent by the selected first base station, the method of the disclosure further includes that: third uplink access configuration information is received from the selected first base station as uplink access configuration information configured for an uplink access of the terminal to a fourth base station. Preferably, the selected first base station sends the third uplink access configuration information through the downlink data channel or the system message. Here, the fourth base station may be, for example, a base station to which the first base station indicates the terminal to be switched.

In the technical solution provided by the disclosure, the one or more first base stations send downlink synchronization signals and part of system messages on the basis of an uplink access request of the terminal, thereby enabling the terminal to complete downlink synchronization with one or more selected first base stations at the same time of completing uplink access and obtain part of the system message of the accessed first base station. In such a manner, the one or more first base stations are not required to periodically send the synchronization signals and part of the system messages, so that system power consumption brought by sending of a synchronization signal and a system broadcast message is greatly reduced, and system resources are saved.

Furthermore, in the uplink access solution provided by the disclosure, recognition of an optimal uplink sending signal and recognition of an optimal downlink sending beam are implemented. Particularly, the uplink access request signals are grouped, then the terminal sends different uplink access request signals on a group of different sending beams, and the first base station feeds back only one first response signal for a group of uplink access request signals and optimizes confirmation of the preferred uplink beam, so that preference of the uplink beam is implemented.

Figure 2:
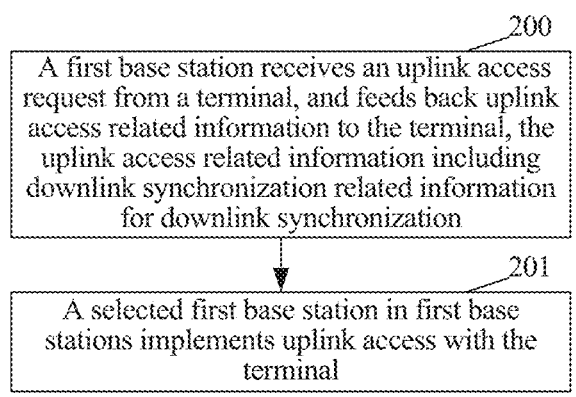
FIG. 2 is a flowchart of another implementation mode of an uplink access method according to an embodiment of the disclosure.

FIG. 2 is a flowchart of another implementation mode of an uplink access method according to the disclosure. As shown in FIG. 2, the method includes the following actions.

In 200, a first base station receives an uplink access request from a terminal, and feeds back uplink access related information to the terminal, the uplink access related information including downlink synchronization related information for downlink synchronization.

Before the action, the method further includes that; the first base station monitors an uplink access request signal set on a first available time-frequency resource set.

The action specifically includes that:

after an uplink access request signal or part of sequences in an uplink access request signal group are successfully detected, the first base station sends a first response signal corresponding to the uplink access request signal or the uplink access request signal group and carrying the uplink access related information at a starting location of a downlink transmission unit in a second available time-frequency resource set.

Before the operation that the first base station monitors the uplink access request signal set on the first available time-frequency resource set, the method further includes that: the first base station receives uplink access configuration information.

Herein, the first response signal carries one or more of the following information:

cell identification information of the first base station;

related information of the uplink access request signal group corresponding to the first response signal sent by the first base station;

information related to a preferred uplink sending beam from the terminal to the first base station;

a duration T1 from time of arrival of a uplink access request signal corresponding to the first response signal to starting of sending of the first response signal;

a difference value between the duration T1 from the time of arrival of the uplink access request signal corresponding to the first response signal to starting of sending of the first response signal and a predetermined duration T4;

if the first response signal corresponds to an uplink access request signal group, each uplink access request signal in the uplink access request signal group is required to be fed back for a corresponding duration T1;

one duration T1 for the group of uplink access request signals corresponding to the first response signal;

reception quality indication information of the uplink access request signals corresponding to the first response signal sent by the first base station;

a downlink system bandwidth of the first base station;

an uplink system bandwidth allocated to the terminal by the first base station;

downlink sending beam information of the first base station; and a related structural parameter of a PHICH.

Before the operation that the first base station monitors the uplink access request signal set on the first available time-frequency resource set in the action, the method further includes that: the first base station receives uplink access configuration information, herein the uplink access configuration information is obtained in one or more of the following manners: the first base station obtains the uplink access configuration information according to a system message from a second base station; or the first base station obtains the uplink access configuration information according to high-layer configuration information from the second base station.

Herein, the uplink access configuration information includes one or more of the following information:

a first uplink access signal sequence set;

information about first uplink access signal sequence group;

first carrier frequency information for sending the uplink access request signals;

second carrier frequency or second carrier frequency set information for receiving the first response signal;

time-domain resource information and/or frequency-domain resource information of the first available time-frequency resource set; and time-domain resource information and/or frequency-domain resource information of the second available time-frequency resource set.

When a first carrier frequency is the same as a second carrier frequency, the uplink access configuration information only carries one of the two carrier frequencies;

when the first carrier frequency and the second carrier frequency form a one-to-one correspondence, the uplink access configuration information only carries one of the two carrier frequencies; and when time-frequency resources in the first available time-frequency resource set form a one-to-one correspondence with time-frequency resources of the second available time-frequency resource set, the uplink access configuration information only carries one of them.

Herein the uplink access request signal meets one of the following characteristics:

one such uplink access request signal corresponds to a first sequence; and one such uplink access request signal corresponds to a product sequence of a first sequence and a second sequence.

Optionally, the first sequence and the second sequence may be obtained through the uplink access configuration information.

In 201, a selected first base station in first base stations implements uplink access with the terminal.

The action includes that: the first base station monitors a second response signal from the terminal; and after the second response signal is successfully received from the terminal, the first base station compares whether cell identification information carried in the second response signal is the same as its cell identification information or not, and if they are the same and the base station allows access of the terminal, the first base station is determined as the selected first base station and sends a third response signal to the terminal on a preferred downlink beam, herein the preferred downlink beam is obtained according to the second response signal.

Furthermore, whether the base station allows access of the terminal or not may be determined as follows: if the first base station simultaneously receives second response signals of multiple terminals, cell identification information carried in the second response signals of the multiple terminals is the cell identification information of the first base station and the second response signals of the multiple terminals carry the same preferred downlink beam, the first base station selects to send the third response signal to one terminal; or whether access of the terminal is allowed or not is determined according to, for example, whether the base station is overloaded or not, which is easy for those skilled in the art to specifically implement on the basis of the technical solution of the disclosure and not intended to limit the scope of protection of the disclosure and will not be elaborated herein.

After the operation that the selected first base station sends a third response to the terminal, the method of the disclosure further includes that: the selected first base station sends second uplink access configuration information to the terminal as uplink access configuration information for a next uplink access of the terminal to the selected first base station. Preferably, the second uplink access configuration information is sent through a downlink data channel or a system message.

After the operation that the selected first base station sends the third response to the terminal, the method of the disclosure further includes that: the selected first base station sends third uplink access configuration information to the terminal and a fourth base station as uplink access configuration information for an uplink access of the terminal to the fourth base station. Preferably, the third uplink access configuration information is sent through the downlink data channel or the system message. Here, the fourth base station may be, for example, a base station to which the first base station indicates the terminal to be switched.

In the technical solution provided by the disclosure, one or more first base stations send downlink synchronization signals and part of system messages on the basis of an uplink access request of the terminal, thereby enabling the terminal to complete downlink synchronization with one or more selected first base stations at the same time of completing uplink access and obtain part of the system message of the accessed first base station. In such a manner, the one or more first base stations are not required to periodically send the synchronization signals and part of the system messages, so that system power consumption brought by sending of a synchronization signal and a system broadcast message is greatly reduced, and system resources are saved.

Furthermore, in the uplink access solution provided by the disclosure, recognition of an optimal uplink sending signal and recognition of an optimal downlink sending beam are implemented. Particularly, the uplink access request signals are grouped, then the terminal sends different uplink access request signals on a group of different sending beams, and the first base station feeds back only one first response signal for a group of uplink access request signals and optimizes confirmation of the preferred uplink beam, so that preference of the uplink beam is implemented.

Figure 3:
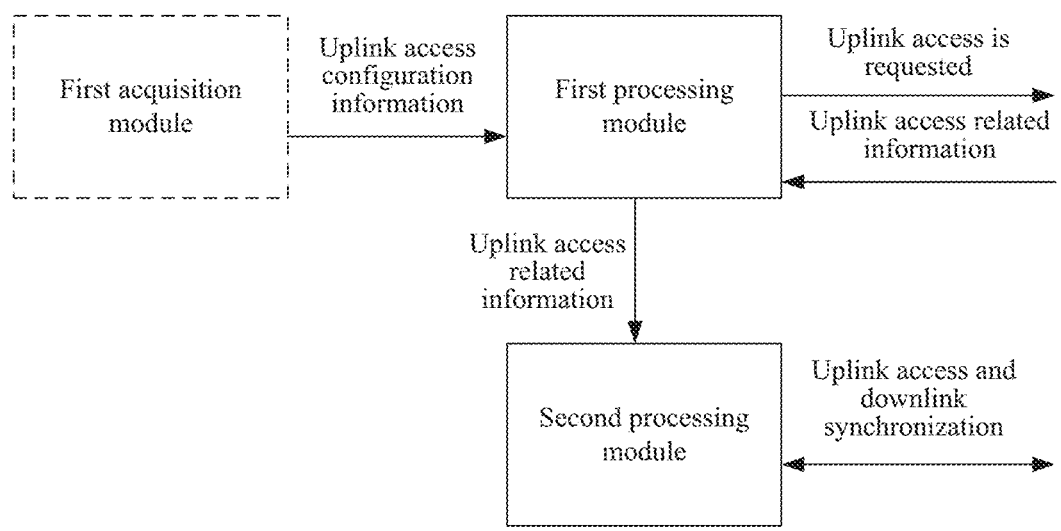
FIG. 3 is a composition structure diagram of a terminal according to an embodiment of the disclosure.

FIG. 3 is a composition structure diagram of a terminal according to the disclosure. As shown in FIG. 3, the terminal at least includes: a first processing module and a second processing module, herein the first processing module is configured to request one or more first base stations for uplink access according to obtained uplink access configuration information and receive uplink access related information returned from the one or more first base stations, the uplink access related information including downlink synchronization related information for downlink synchronization; and the second processing module is configured to select the first base station for uplink access according to the received uplink access related information.

When the terminal does not complete downlink synchronization with the first base station returning the uplink access related information according to the downlink synchronization related information in the returned uplink access related information, the second processing module is further configured to complete downlink synchronization with the selected first base station.

Furthermore, the terminal of the disclosure also includes:

a first acquisition module, configured to obtain the uplink access configuration information according to a system broadcast message from a second base station or obtain the uplink access configuration information according to high-layer configuration information from the second base station.

Herein, the first processing module is specifically configured to: send an uplink access request signal indicated by the uplink access configuration information to one or more first base stations on one or more first time-frequency resources of a first available time-frequency resource set indicated by the uplink access configuration information and detect (a) first response signal(s) sent by the one or more first base stations and carrying the uplink access related information on one or more second time-frequency resources of a second available time-frequency resource set indicated by the uplink access configuration information, herein the first response signal has a specific structure on the second time-frequency resource.

Herein, the operation that the first processing module sends the uplink access request signal to the one or more first base stations on the first time-frequency resources specifically includes that:

the terminal sends a group of uplink access request signals on different uplink beams on the first time-frequency resources; and the terminal sends one or more groups of uplink access request signals on multiple groups of uplink beams in different time buckets, herein the uplink access request signals corresponding to intra-group beams occupying the same time-frequency resource are different first sequences; or the intra-group beams occupying the same time-frequency resource are divided into multiple clusters, different clusters of the same group correspond to the same first sequence group and different second sequences, different beams in each cluster correspond to different first sequences, and at this moment, the uplink access request signal sent on each beam is a product sequence of the corresponding first sequence and second sequence, herein all the uplink access request signals corresponding to all the beams occupying the same time-frequency resource form a group of uplink access request signals.

Herein, a pattern relationship between a time-frequency resource occupied by a DCI and a time-frequency resource occupied by a demodulation reference signal on the second time-frequency resource is agreed upon in advance by the first base station and the terminal; and the time-frequency resource occupied by the demodulation reference signal on the second time-frequency resource is agreed upon in advance by the first base station and the terminal.

The first processing module is further configured to: complete downlink synchronization with the first base station within a larger time range according to index information, carried in the first response signal, of a transmission unit where the first response signal is located in longer time, herein the index information is divided into two levels: a first-level index information that is index information of the transmission unit in a first time unit, and a second-level index information that is index information of the first time unit where the transmission unit is located in a second time unit, herein the first time unit includes M1 transmission units, the second time unit includes M2 first time units, and both of M1 and M2 are integers more than or equal to 1, and are fixed values agreed upon in advance by the first base station and the terminal. Correspondingly, the first response signal only carries the first-level index information, or the first response signal carries the first-level index information and the second-level index information.

The second processing module is specifically configured to:

select the first base station for uplink access from the one or more first base stations from which the first response signals are successfully received;

obtain downlink timing with the first base station for uplink access according to the first response signal sent by the selected first base station, obtain TA information of starting time of an uplink transmission unit to the selected first base station relative to a corresponding downlink transmission unit, obtain information about a preferred uplink sending beam arriving at the selected first base station and obtain information about a preferred downlink beam from the selected first base station to the terminal; and send a second response signal to the selected first base station on one or more uplink sending beams.

Herein, the information about the TA is obtained as follows:

the terminal obtains the information about the TA according to information of a duration T1 from time of arrival of the uplink access request signals corresponding to the first response signal to starting of sending of the first response signal in the first response signal, or the terminal obtains the information about the TA according to a corresponding duration T1 for each uplink access request signal in the uplink access request signal group corresponding to the first response signal, uplink access request signal information carried in the first response signal, and a duration T3 from starting time when the terminal sends the uplink access request signal to time of arrival of the first response signal corresponding to the uplink access request signal.

When a third response signal sent by the selected first base station is successfully received, the second processing module is further configured to: receive second uplink access configuration information from the selected first base station as uplink access configuration information configured for a next uplink access of the terminal where the second processing module is located to the selected first base station.

Preferably, the selected first base station sends the second uplink access configuration information through a downlink data channel or a system message.

When the third response signal sent by the selected first base station is successfully received, the second processing module is further configured to: receive third uplink access configuration information from the selected first base station as uplink access configuration information configured for an uplink access of the terminal where the second processing module is located to a fourth base station.

Preferably, the selected first base station sends the third uplink access configuration information through the downlink data channel or the system message.

Figure 4:
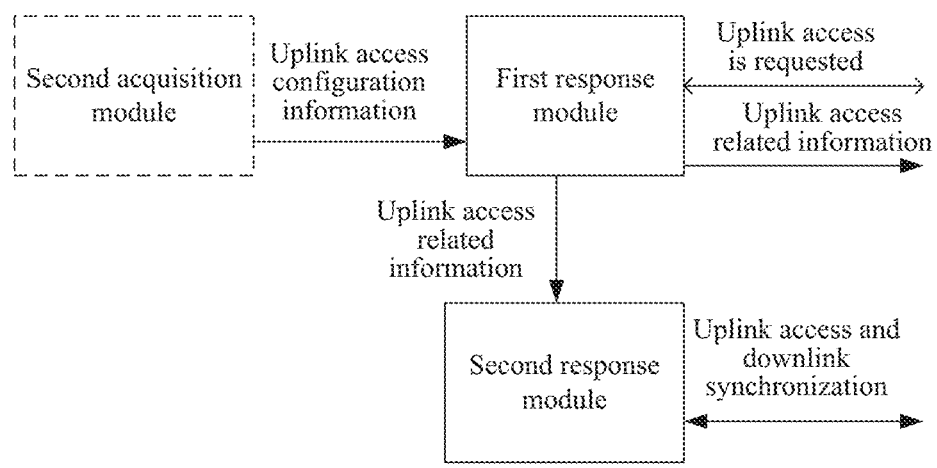
FIG. 4 is a composition structure diagram of a base station according to an embodiment of the disclosure.

FIG. 4 is a composition structure diagram of a base station according to the disclosure. As shown in FIG. 4, the base station at least includes: a first response module and a second response module, herein the first response module is configured to receive an uplink access request from a terminal and feed back uplink access related information to the terminal, the uplink access related information including downlink synchronization related information for downlink synchronization; and the second response module is configured to, responsive to determination of the base station where it is located as a selected first base station, implement uplink access with the terminal.

When the first base station returning the uplink access related information does not complete preliminary downlink synchronization with the terminal, the second response module is further configured to: complete, by the selected first base station, downlink synchronization with the terminal.

The base station of the disclosure further includes a second acquisition module, configured to obtain uplink access configuration information according to a system message from a second base station or obtain the uplink access configuration information according to high-layer configuration information from the second base station.

Specifically, the first response module is specifically configured to: monitor an uplink access request signal set indicated by the uplink access configuration information on a first available time-frequency resource set indicated by the uplink access configuration information; and after an uplink access request signal or part of sequences in an uplink access request signal group are successfully detected, send a first response signal corresponding to the uplink access request signal or the uplink access request signal group and carrying the uplink access related information at a starting location of a downlink transmission unit in a second available time-frequency resource set indicated by the uplink access configuration information.

The second response module is specifically configured to: monitor a second response signal from the terminal; and after the second response signal is successfully received from the terminal, compare whether cell identification information carried in the second response signal is the same as its cell identification information or not, and if they are the same and the base station allows access of the terminal, determine the base station where the second response module is located as the selected first base station and send a third response signal to the terminal on a preferred downlink beam, herein the preferred downlink beam is obtained according to the second response signal.

Furthermore, the second response module is further configured to: if the first base station simultaneously receives second response signals of multiple terminals, cell identification information carried in the second response signals of the multiple terminals is the cell identification information of the first base station and the second response signals of the multiple terminals carry the same preferred downlink beam, select, by the base station, to send the third response signal to one terminal.

Herein, the third response signal carries one or more of the following information:

related indication information indicating completion of sending and receiving signals associated with uplink access and downlink synchronization between the terminal and the selected first base station;

identification information of the terminal;

information about a preferred uplink sending beam from the terminal to the selected first base station; and index information of a first time unit where the third response signal is located in a second time unit.

Or, the third response signal carries one or more of the following information:

related indication information indicating completion of sending and receiving signals associated with uplink access and downlink synchronization between the terminal and the selected first base station;

the identification information of the terminal;

the information about the preferred uplink sending beam from the terminal to the selected first base station;

the index information of the first time unit where the third response signal is located in the second time unit;

a downlink system bandwidth of the first base station;

an uplink system bandwidth allocated to the terminal by the first base station; and a related structural parameter of a PHICH.

After the selected first base station sends a third response to the terminal, the second response module is further configured to: send second uplink access configuration information to the terminal as uplink access configuration information for a next uplink access of the terminal to the selected first base station.

Preferably, the second uplink access configuration information is sent through a downlink data channel or a system message.

After the selected first base station sends the third response to the terminal, the second response module is further configured to: send third uplink access configuration information to the terminal and a fourth base station as uplink access configuration information for an uplink access of the terminal to the fourth base station.

Optionally, the third uplink access configuration information is sent through the downlink data channel or the system message.

The technical solutions of the disclosure will be described below in combination with specific embodiments in detail. In the embodiments, descriptions are made with the condition that an uplink access request signal is a Preamble sequence, a first sequence is a ZC sequence and a second sequence is a PN sequence as an example but not intended to limit the scope of protection of the disclosure.

Figure 5:
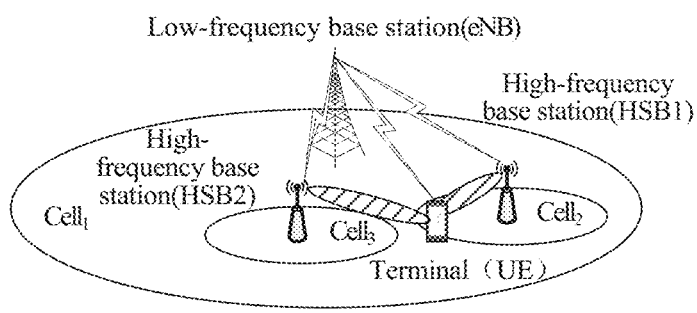
FIG. 5 is a schematic diagram of an embodiment of a network architecture implementing uplink access according to an embodiment of the disclosure.
Figure 6:
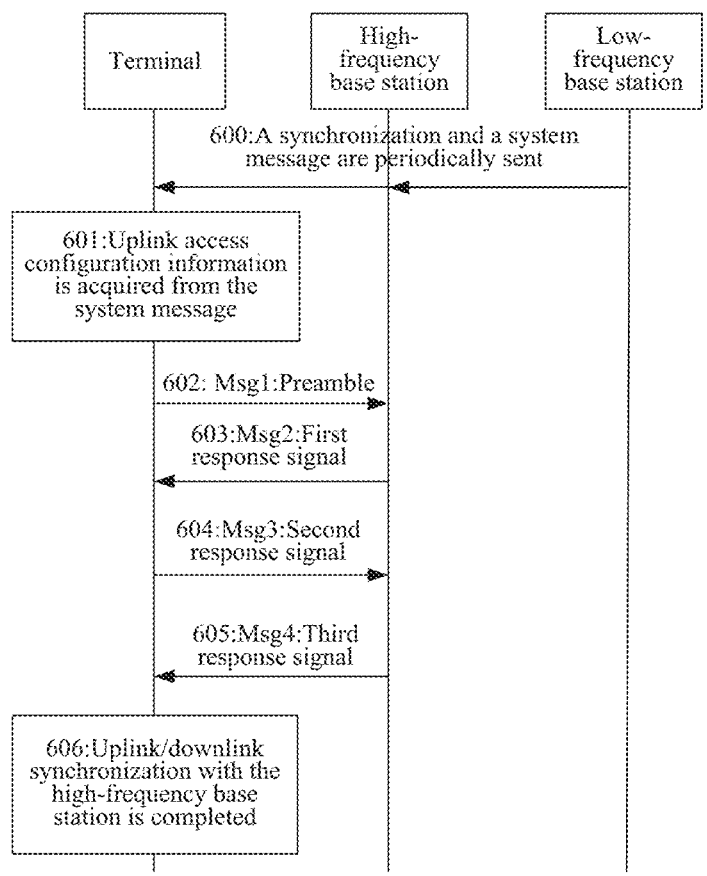
FIG. 6 is a flowchart of a method of a first embodiment implementing uplink access according to an embodiment of the disclosure.

In a first embodiment, as shown in FIG. 5, there is made such a hypothesis that a first base station is a high-frequency base station and a second base station is a low-frequency base station. There is also made such a hypothesis that there is one or more high-frequency base stations such as an HSB1 and HSB2 shown in FIG. 5 under coverage of the low-frequency base station such as an Evolved Node B (eNB) in FIG. 5. FIG. 6 is a flowchart of a method of a first embodiment implementing uplink access according to the disclosure. The uplink access method according to the disclosure includes the following actions.

In 600~601, the low-frequency base station periodically sends a downlink synchronization signal and a system message, and the high-frequency base stations, i.e., the HSB1 and the HSB2, and a terminal detect the downlink synchronization signal sent by the low-frequency base station, complete downlink synchronization with the low-frequency base station and read the system message sent by the low-frequency base station to obtain uplink access configuration information configured for an uplink access process.

Herein, an uplink access configuration includes one or any combination of the following information: Preamble set information; first carrier frequency information; second carrier frequency or second carrier frequency set information; time-domain and/or frequency-domain resource information of a first available time-frequency resource set; time-domain and/or frequency-domain resource information of a second available time-frequency resource set; a cell identifier set of one or more first base stations; target receiving power (Target Power-Preamble) of a Preamble arriving at the high-frequency base stations; a length of a waiting window for waiting for a first response signal after sending of a Preamble sequence is ended; and a power improvement step length for sending of the Preamble sequence after the Preamble sequence is failed to be sent and no first response signal is received.

Specifically, corresponding to the terminal, the uplink access configuration information corresponds to the following information: an uplink access signal Preamble set; first carrier frequency information for sending an uplink synchronization access signal Preamble; second carrier frequency or second carrier frequency set information for receiving the first response signal; time-domain and/or frequency-domain resource information of the first available time-frequency resource set for sending the synchronization access signal; time-domain and/or frequency-domain resource information of the second available time-frequency resource set for receiving the first response signal; the cell identifier set of the one or more first base stations required to be monitored by the terminal; the target receiving power Target Power-Preamble of the Preamble arriving at the high-frequency base stations; the length of the waiting window for the terminal to wait for the first response signal after sending of the Preamble sequence is ended; and the power improvement step length for sending of the Preamble sequence after the terminal fails to send the Preamble sequence and receives no first response signal.

Corresponding to the high-frequency base stations, the uplink access configuration information corresponds to the following information: the uplink access signal Preamble set required to be monitored; first carrier frequency information corresponding to the uplink synchronization access signal Preamble required to be monitored; the second carrier frequency or second carrier frequency set information for sending first response signals; the time-domain and/or frequency-domain resource information of the first available time-frequency resource set corresponding to the uplink synchronization access signal Preamble required to be monitored; the time-domain and/or frequency-domain resource information of the second available time-frequency resource for sending the first response signals; the target receiving power Target Power-Preamble of the Preamble arriving at the high-frequency base stations; and delay window lengths for the base stations from reception of the Preamble sequence to sending of the first response signals.

In the first embodiment, all the high-frequency base stations and high-frequency terminals under the low-frequency coverage share the same set of uplink access configuration information, that is, before the access process, the high-frequency base stations and the low-frequency base station are not required to perform uplink synchronization, and the terminal and the low-frequency base station are not required to perform uplink synchronization.

In 602, the terminal sends an uplink access signal such as a Preamble, called an Msg1, as shown in FIG. 6, at any resource location in the first available time-frequency resource set or a starting location of a high-frequency transmission unit in the first available time-frequency resource set. The terminal may randomly select one or more uplink access signals Preamble from the Preamble set, Preamble sequences are ZC sequences, the terminal sends the Preamble sequences on different uplink sending beams, and different beams correspond to different Preamble sequences.

The one or more high-frequency base stations, such as the HSB1 and HSB2 in FIG. 5, monitor all Preambles in the Preamble set on the first available time-frequency resource set, and the one or more high-frequency base stations successfully receive the Preamble sent by the terminal. As shown in FIG. 5, at this moment, only one of the HSB1 and the HSB2 successfully detects the Preamble sent by the terminal; or, both of the HSB1 and the HSB2 successfully detect the same Preamble sent by the terminal; or, both of the HSB1 and the HSB2 successfully detects Preambles sent by the terminal, and Preamble sequences detected by the HSB1 and the HSB2 are different; or, the HSB1 successfully detects multiple Preamble sequences sent by the terminal through different sending beams.

In 603, the HSB1 and/or the HSB2 sends first response signals, called Msg2, as shown in FIG. 6, for each successfully detected Preamble sequence at (a) starting location(s) of (a) downlink transmission unit(s) in the second available time-frequency resource set, herein the same high-frequency base station may send the first response signals corresponding to different Preambles at different moments.

The first response signal sent by the high-frequency base station may include the following information: related information about that downlink synchronization with the high-frequency base station is completed; cell identification information of the high-frequency base station; related information about the Preamble corresponding to the first response signal sent by the high-frequency base station; a duration T1 for the high-frequency base station from time of arrival of the received Preamble corresponding to the first response signal to starting of sending of the first response signal; reception quality indication information about the Preamble signal received by the high-frequency base station and corresponding to the first response signal; a Temporary Cell Radio Network Temporary Identity (Temp-CRNTI) configured to scramble a subsequent second response signal and scramble a DCI corresponding to a third response signal; a related system message of the high-frequency base station, for example, including a downlink system bandwidth and an uplink system bandwidth, herein, when the uplink system bandwidth forms a one-to-one correspondence with the downlink system bandwidth, only one of them is notified; and an uplink time-frequency resource and coding mode transmission information allocated to the terminal and configured to transmit the second response signal.

At this moment, the high-frequency base stations may send the same first response signals in directions of multiple downlink sending beams, and demodulation reference signals configured to demodulate data parts in the first response signals form a mapping relationship with the cell identification information and beam information. Preferably, the demodulation reference signals form a one-to-one correspondence with the cell identification information and the beam information, that is, the terminal may recognize whether the first response signals belong to the HSB1 or the HSB2 through the demodulation reference signals in the first response signals and may recognize a specific beam of the specific base station.

At this moment, the terminal monitors the first response signals corresponding to all the Preamble sequences sent by the terminal on the second available time-frequency resource set and then selects a selected high-frequency base station from the high-frequency base stations, herein a method for selecting the high-frequency base station for uplink access, with which downlink synchronization is completed, from the high-frequency base stations includes that:

according to the reception quality indication information carried in the first response signals, one manner is that the terminal selects the first response signal corresponding to the Preamble sequence with highest reception quality from the terminal to the first base stations, the reception quality indication information being fed back to the terminal by the first base stations through the first response signals, obtains the other related information on the basis of the selected first response signal and performs subsequent uplink access related signal sending and receiving, and the high-frequency base station corresponding to the cell identification information carried in the selected first response signal is determined as the selected high-frequency base station and obtains an optimal uplink sending beam according to Preamble information in the first response signal; and the other manner is that the terminal selects multiple uplink sending beams on the basis of multiple received first response signals, sends the second response signal on the multiple selected uplink sending beams and carries uplink sending beam information in the second response signal.

Herein, the one or more first response signals selected by the terminal meet one or more of the following characteristics:

when the terminal selects only one first response signal, reception quality carried in the selected first response signal is highest, and at this moment, the high-frequency base station corresponding to the selected first response signal is determined as the selected high-frequency base station; and when the terminal selects multiple first response signals, the multiple selected first response signals carry the same cell identification number of the first base station and the high-frequency base station corresponding to the selected first response signals is determined as the selected high-frequency base station, herein the multiple selected first response signals include the first response signal with the highest reception quality and it is obtained from the multiple selected first response signals that a maximum interval between multiple starting locations at which the terminal sends the uplink signals to the selected high-frequency base station meets a preset threshold value $T_{thresh}$.

When the terminal selects the high-frequency base station on the basis of reception quality of the first response signals on a terminal side, the selected first response signals include the first response signal arriving at the terminal side with highest reception quality; and the terminal may also comprehensively select the first response on the basis of the reception quality of the first response signals on the terminal side and the reception quality of the Preambles arriving at the high-frequency base stations.

In 604, the terminal sends the second response signal, called an Msg3, as shown in FIG. 6, to the selected high-frequency base station on the basis of the one or more selected optimal uplink sending beams.

Herein, the second response signal may include the following information: the cell identification information of the selected high-frequency base station, information about a preferred downlink sending beam from the selected high-frequency base station to the terminal and identification information of the terminal, and if the second response signal is sent on more than one uplink sending beam, further carries beam information for recognizing the uplink sending beam.

The selected high-frequency base station receives the second response signal from the terminal, and if the high-frequency base station allows access of the terminal, the selected high-frequency base station is prepared to send a third response signal to the terminal.

In 605, the selected high-frequency base station sends the third response signal, called an Msg4, as shown in FIG. 6, to the terminal.

Herein, the third response signal may carry the following information: related indication information about that the terminal completes sending and receiving signals associated with uplink access and downlink synchronization with the selected high-frequency base station; and the identification information of the terminal. If the second response signal in 604 carries the uplink sending beam information, the third response signal further carries preferred uplink sending information.

The terminal detects the third response signal from the selected high-frequency base station on an optimal downlink beam in 604, and if the terminal successfully detects the third response signal and the identification information, carried in the third response signal, of the terminal is the same as that of the terminal, the terminal completes sending and receiving of related signals of the uplink access process with the selected high-frequency base station. The terminal completes downlink synchronization with the selected high-frequency base station at the same time of completing uplink access, which is applied to high-frequency communication, and in this process, training of the preferred uplink and downlink sending beams is also completed.

In the first embodiment, for a Preamble sequence, the Preamble sequence is sent to a high-frequency station at a starting location of any transmission unit of the first available time-frequency resource set. As shown in FIG. 7(*a*), as shown in the shadow parts, there is a first available time-frequency resource on each of a first subframe and fourth subframe shown, and the figure is only exemplary and does not exclude the condition that the first available time-frequency resources are occupied by other subframes; and moreover, frequency-domain resources, occupied by the shown subframes, of first available resources are also only exemplary, moreover, a central carrier frequency of the subframe of the low-frequency base station is a low carrier frequency, carrier frequencies corresponding to the subframes of the high-frequency base station include a first carrier frequency and second carrier frequency corresponding to a receiving carrier frequency and sending carrier frequency of the high-frequency base station respectively, and carrier frequencies of the subframes of the terminal include a first carrier frequency and second carrier frequency corresponding to a sending carrier frequency and receiving carrier frequency of the terminal respectively. At this moment, A timing error of the high-frequency base station and the low-frequency base station is generated by a timing error of two base stations or timing of the high-frequency base station based on the downlink synchronization signal of the low-frequency base station, and a timing error of the low-frequency base station and the terminal is caused by timing of the terminal through the downlink synchronization signal of the low-frequency base station and a downlink transmission delay of the synchronization signal of the low-frequency base station to the terminal. Moreover, since a length of a transmission unit (i.e., the subframe in the figure) of the high-frequency base station is very likely to be smaller than a length of the subframe of the low-frequency station, as shown in FIG. 7(*b*) and FIG. 7(*c*), also as shown in the shadow parts, at this moment, a structural pattern of high-frequency subframes in a low-frequency subframe is fixed. Preferably, a low-frequency subframe includes an integral number of high-frequency subframes. Moreover, in FIG. 7(*a*)-FIG. 7(*c*), the low-frequency base station also has first available uplink access transmission resources corresponding to low-frequency uplink access resources. Thus it can be seen that, at this moment, the low-frequency and high-frequency uplink access resources may be notified by adopting the same set of uplink access configuration information, but the high-frequency terminal/high-frequency base station and the low-frequency terminal have different understandings to the uplink access configuration information, and there is uplink access configuration information exclusive to the high-frequency terminal/base station and the low-frequency terminal. In such a manner, the low-frequency base station is required to broadcast only one piece of uplink access configuration information in the system message and is not required to notify the low-frequency terminal and the high-frequency terminal/high-frequency base station respectively, so that system message broadcast is reduced. At this moment, the low-frequency terminal ignores specific parts, for example, a cell identification information set and second available time-frequency resources, for the high-frequency base station and the high-frequency terminal in the uplink access configuration information. For the high-frequency terminal/high-frequency base station, if a location of the low-frequency subframe occupied by the first available time-frequency resources is notified in the uplink access configuration information, at this moment, the uplink access configuration information is required to further notify indexes of high-frequency subframes of the first available time-frequency resources in the low-frequency subframe for the high-frequency base station and the high-frequency terminal, for example, in an integral number of high-frequency subframes in a low-frequency sub-frame in FIG. 7(*a*)-FIG. 7(*c*), only the high-frequency subframes at the shadow parts are first available time-frequency resources; or, at this moment, all of the high-frequency subframes included in the low-frequency subframe occupied by the first available time-frequency resources are high-frequency uplink access subframes, as shown in FIG. 7(*d*), also shown in the shadow parts, at this moment, the high-frequency base station and the terminal determine that an uplink access signal is sent at a starting location of a high-frequency subframe, and then the indexes of the high-frequency subframes in the low-frequency subframe are not required to be notified in the first available resources for the high-frequency base station in the system message. Of course, the first embodiment does not exclude the condition that the low-frequency base station notifies the uplink access configuration information for a low frequency and a high frequency through the system broadcast message respectively.

Figure 7A:
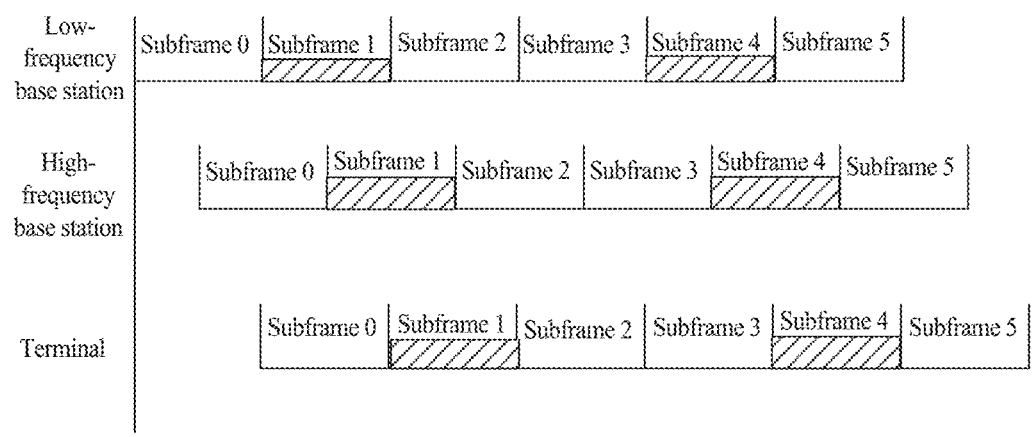
FIG. 7(a) is a schematic diagram of a first embodiment of a transmission location of a first available time-frequency resource according to an embodiment of the disclosure.
Figure 7B:
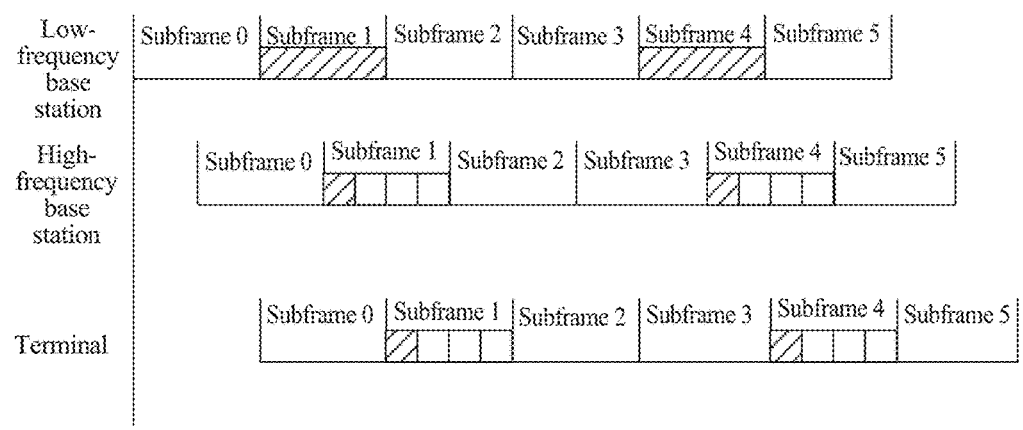
FIG. 7(b) is a schematic diagram of a second embodiment of a transmission location of a first available time-frequency resource according to an embodiment of the disclosure.
Figure 7C:
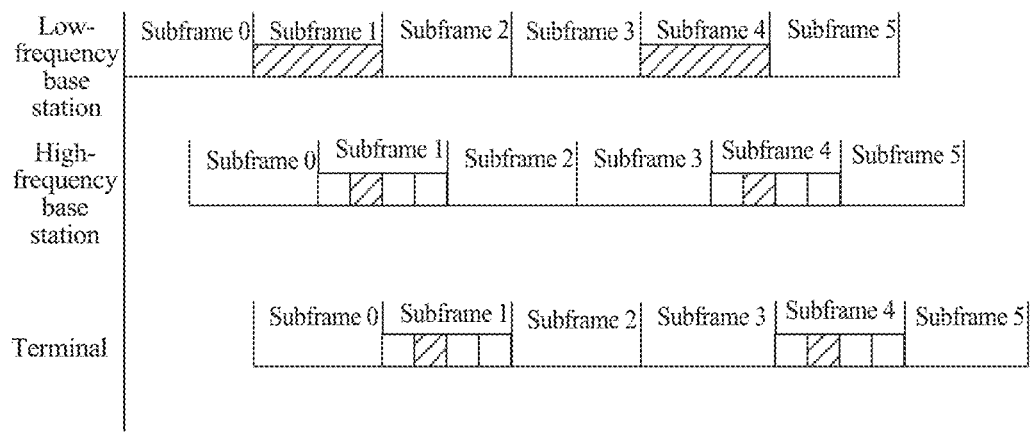
FIG. 7(c) is a schematic diagram of a third embodiment of a transmission location of a first available time-frequency resource according to an embodiment of the disclosure.
Figure 7D:
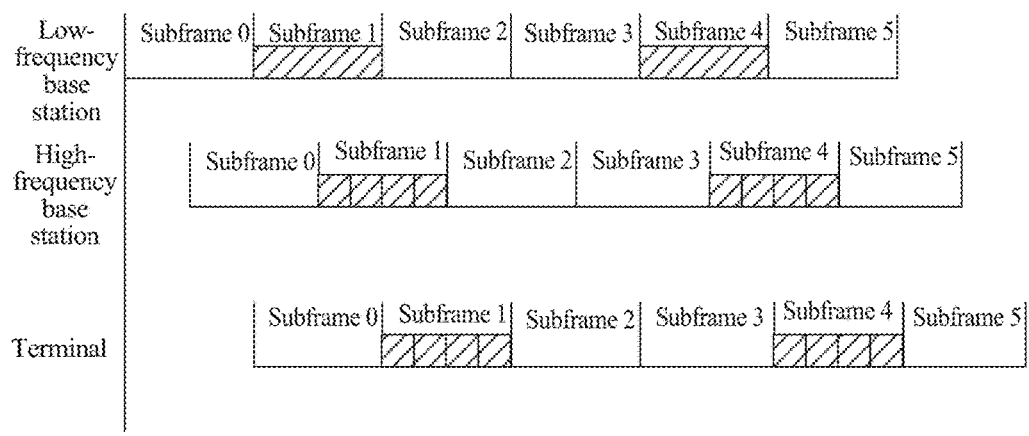
FIG. 7(d) is a schematic diagram of a fourth embodiment of a transmission location of a first available time-frequency resource according to an embodiment of the disclosure.
Figure 8A:
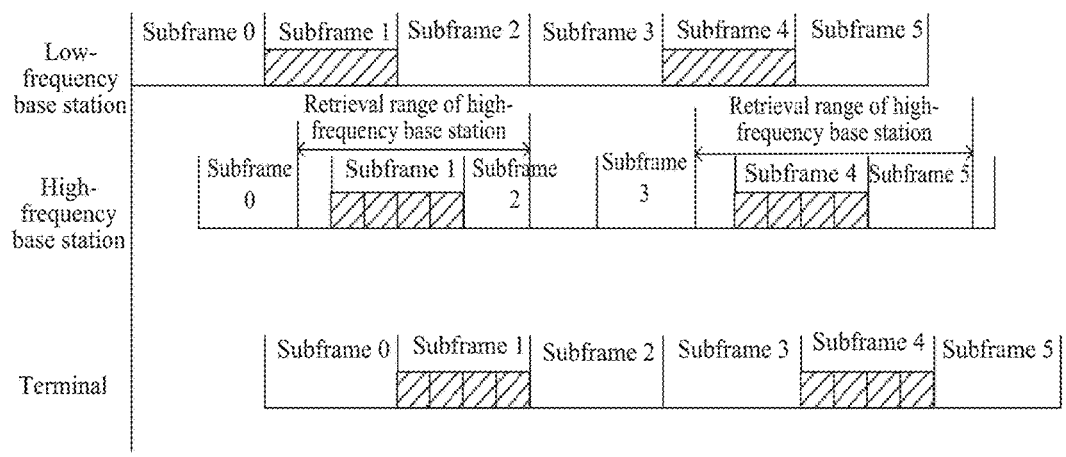
FIG. 8(a) is a schematic diagram of a first embodiment of a time-domain range where a high-frequency base station monitors a Preamble according to an embodiment of the disclosure.
Figure 8B:
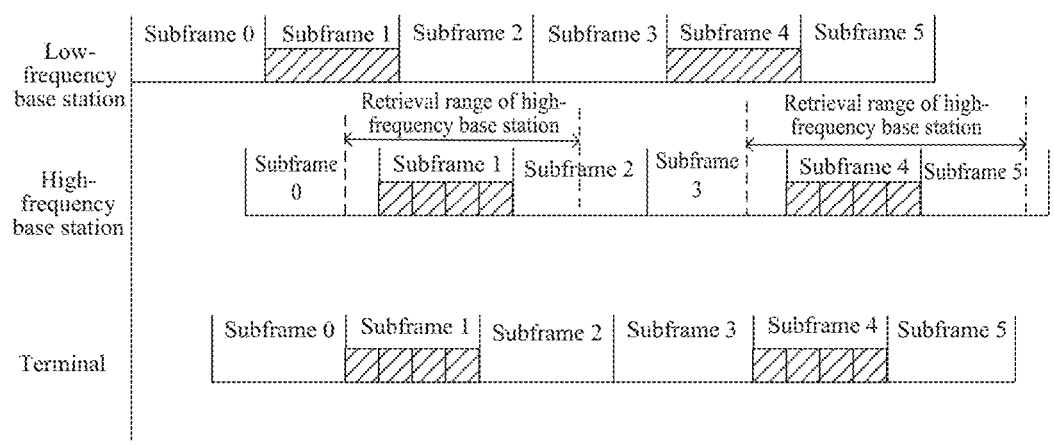
FIG. 8(b) is a schematic diagram of a second embodiment of a time-domain range where a high-frequency base station monitors a Preamble according to an embodiment of the disclosure.
Figure 8C:
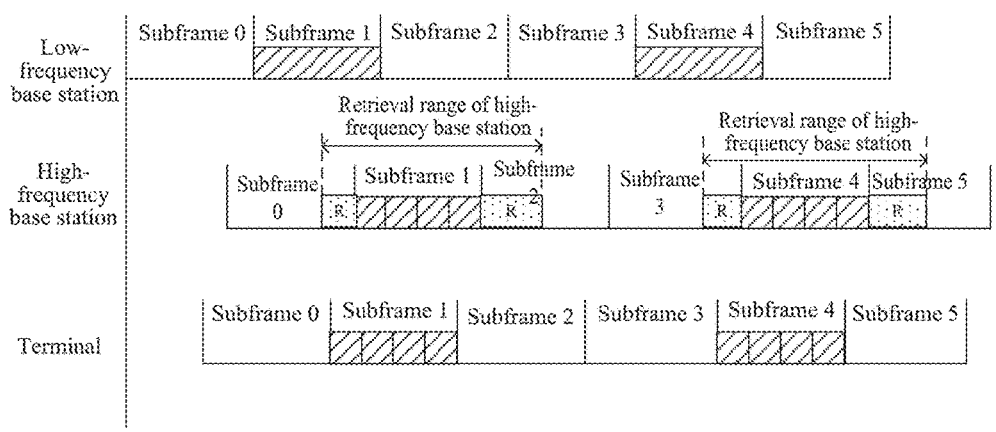
FIG. 8(c) is a schematic diagram of an embodiment where a high-frequency base station reserves a resource configured as an uplink access resource around a time domain of a first time-frequency resource notified by a low-frequency base station according to an embodiment of the disclosure.

The terminal sends the Preamble sequence at any location of the first available time-frequency resource shown in FIG. 7(a), or, sends the Preamble sequence at a starting location of a transmission unit of the first available time-frequency resource set shown in FIG. 7(b)~FIG. 7(d). If the subframes of all the high-frequency base stations under the coverage of the low-frequency base station have the same length, a manner shown in FIG. 7(b)~FIG. 7(d) may be adopted to send the Preamble sequence at the starting location of the transmission unit. If the subframes of all the high-frequency base stations under the coverage of the low-frequency base station are different and the lengths of the subframes of the same high-frequency base station also change in real time, a manner shown in FIG. 7(a) may be adopted to send the Preamble sequence at any location of the first available time-frequency resource. Moreover, at this moment, the high-frequency base station and terminal shown in FIG. 7(a)~FIG. 7(d) are in a downlink out-of-synchronism state, that is, there are two conditions shown in FIG. 8(a) and FIG. 8(b) for timing of the high-frequency base station and terminal in FIG. 7(a)~FIG. 7(d) at this moment, namely downlink timing of the high-frequency base station is before timing of the terminal and the timing of the high-frequency base station is after the timing of the terminal. Therefore, as shown in FIG. 8(a) and FIG. 8(b), the high-frequency base station is required to retrieve the Preamble sequence within a wider range of the first available time-frequency resource. Of course, the retrieval range in the figures is also only exemplary, and on the basis of implementation of the high-frequency base station, the retrieval range may be different. Or, for improving detection accuracy of the high-frequency base station over the uplink access Preamble signal, the high-frequency base station reserves some resources configured to receive the uplink access Preamble signal around the first time-frequency resource notified by the low-frequency base station and does not allocate the reserved resources to other services. As shown in FIG. 8(c), R shown by the snowflake shadows represents uplink access detection resources reserved, by the high-frequency base station, around a time domain of the first time-frequency resource notified by the low-frequency base station, the parts represented by R shown in the snowflake shadows depend on implementation of the high-frequency base station, different high-frequency base stations have different implementations, reserved R patterns may be notified to the terminal performing service transmission with the high-frequency base station through the system message or another message, and moreover, the R resources are not configured as downlink transmission resources of the high-frequency base station and uplink resources of the other terminal. Preferably, the R resources occupy the same frequency-domain bandwidth with the first time-frequency resource, and are around the first time-frequency resource in a time domain.

Figure 9A:
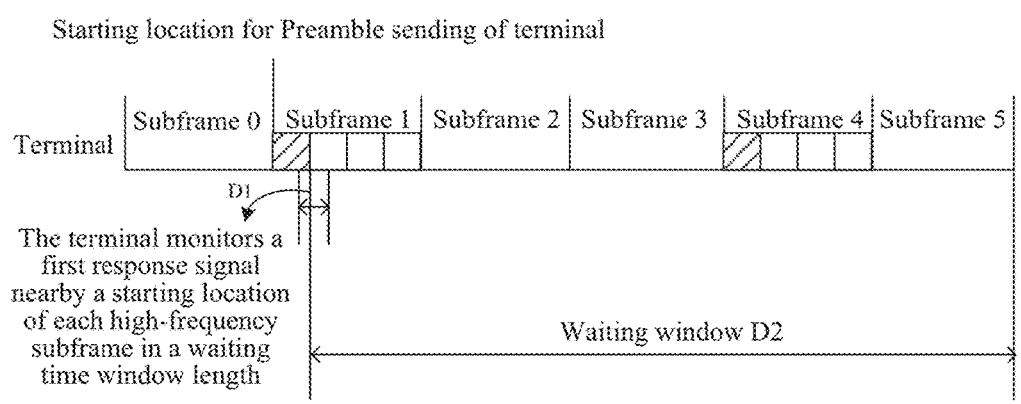
FIG. 9(a) is a schematic diagram of a first embodiment where a terminal monitors a first response signal nearby a starting location of each high-frequency subframe in a waiting window according to an embodiment of the disclosure.
Figure 9B:
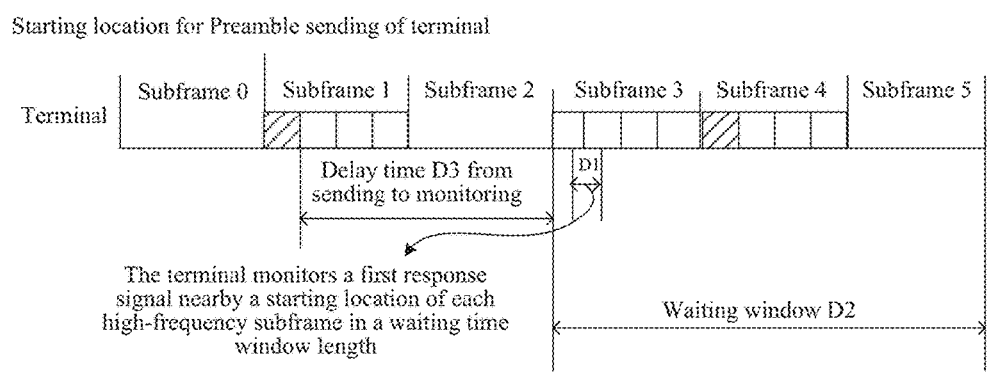
FIG. 9(b) is a schematic diagram of a second embodiment where a terminal monitors a first response signal nearby a starting location of each high-frequency subframe in a waiting window according to an embodiment of the disclosure.

A time-domain resource of a second available time-frequency resource is a time window after the terminal sends the Preamble in the first example, and a length of the time window is notified in the uplink access configuration information. Since the high-frequency base station sends the first response signal at a starting location of a high-frequency subframe, the terminal is only required to retrieve the demodulation reference signal (which is also a synchronization signal, that is, correlation is performed) corresponding to the first response signal by taking time nearby the starting location of each high-frequency subframe in a waiting window D2 shown in FIG. 9(a)~FIG. 9(b) as time of arrival of the first response signal, that is, the first response signal is detected by taking each spaced point within a range of D1 shown in FIG. 9(a)~FIG. 9(b) nearby the starting location of each high-frequency subframe as the time of arrival of the first response signal. In such a manner, the terminal is not required to take each point in the waiting window D2 as the time of arrival of the first response for detection, so that detection complexity of a receiver is reduced. As shown in FIG. 9(a)~FIG. 9(b), the waiting window D2 is only exemplary, and moreover, at this moment, the terminal is required to know about the lengths of the high-frequency subframes, i.e., a distribution pattern of the high-frequency subframes in the low-frequency subframe, in advance. In another implementation mode of the first embodiment, the terminal may take each point in the waiting window D2 as the time of arrival of the first response signal for detection. In FIG. 9(a), it is the starting location of the waiting window after the terminal completes sending the Preamble, and in FIG. 9(b), the waiting window is started with a delay of a time length of delay time D3 from sending to monitoring after the terminal completes sending the Preamble, herein the waiting window D2 and the delay time D3 are notified through the uplink access configuration information or fixed, D1 may be notified through the uplink access configuration information or an implementation problem of the terminal, and different terminals may adopt different D1 parameters, herein D1 is a window determined by the terminal to be a real start of the high-frequency subframe arriving at the first base station nearby the high-frequency subframe. Since the terminal is in the downlink out-of-synchronism state with the high-frequency base station at this moment, a start of the high-frequency subframe at the terminal is not the real start of the high-frequency subframe, and the start is only rough timing obtained by the terminal according to the low-frequency base station.

Figure 10:
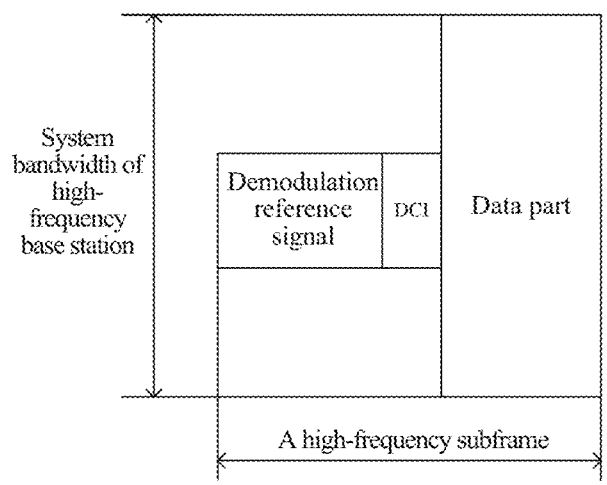
FIG. 10 is a schematic diagram of an embodiment of downlink time-frequency resources occupied by different parts of a first response signal according to an embodiment of the disclosure.

In 603 of the first embodiment, the high-frequency subframe through which the high-frequency base station sends the first response signal has a certain structure, and the first response signal is divided into three parts: the data part, the demodulation reference signal part configured to demodulate the data part and the DCI part indicating a transmission mode of the data part and an occupied time-frequency resource, herein the demodulation reference signal is also a downlink synchronization signal and is configured to implement downlink subframe synchronization with the high-frequency base station. On a second time-frequency resource, a time-frequency resource occupied by the demodulation reference signal forms a fixed pattern relationship with a time-frequency resource occupied by a DCI, and the time-frequency resource occupied by the demodulation reference signal on each second time-frequency resource is fixed. An implementation mode of a relationship among time-frequency resources occupied by the three parts of the first response signal is shown in FIG. 10. The time-frequency resources, i.e., second time-frequency resources, where the demodulation reference signal and the DCI in FIG. 10 may be obtained through the second available resource set in the uplink access configuration information. Moreover, since a location occupied by the demodulation reference signal on the second time-frequency resource is fixed, the terminal detects the demodulation reference signal according to the location occupied by the demodulation reference signal, and as long as successfully receiving the demodulation reference signal, the terminal may obtain the time-frequency resource occupied by the DCI according to the fixed relationship between the time-frequency resources occupied by the demodulation reference signal and the DCI, and the transmission mode of the DCI is fixed, for example, a Modulation Coding Scheme (MCS) is fixed, that is, a channel coding and modulation mode is fixed. The terminal receives the DCI to know about a system bandwidth of the high-frequency base station sending the first response signal, so that the time-frequency resource occupied by the data part, the transmission mode and the like may be obtained according to of the time-frequency resource allocation, notified in the DCI, for the data part, and a signal of the data part may further be obtained. It is important to note that, before the terminal successfully receives the DCI, the terminal does not know about the downlink system bandwidth of the high-frequency base station, so that a bit number before channel coding in the DCI does not depend on the system bandwidth. Preferably, the bit number before channel coding in the DCI is fixed and does not change along with the system bandwidth.

Figure 11A:
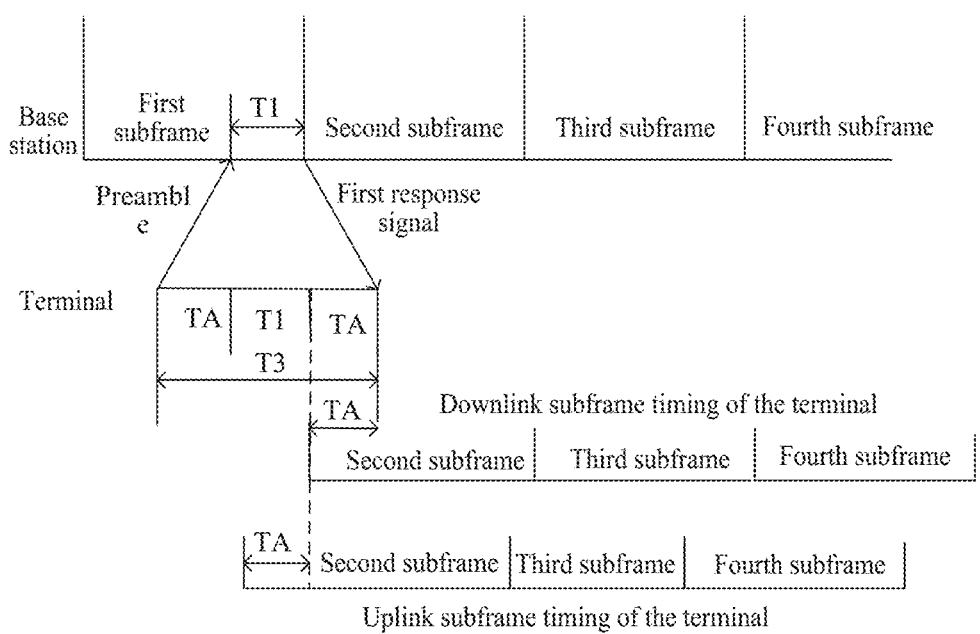
FIG. 11(a) is a schematic diagram of a first embodiment where a terminal acquires uplink subframe timing and downlink subframe timing according to an embodiment of the disclosure.

In the first embodiment, since it is determined that the first response signal is started to be sent at the starting location of a transmission unit of the high-frequency base station, the terminal obtains downlink subframe timing with the high-frequency base station on the basis of the demodulation reference signal (which is also a downlink synchronization signal) in the first response signal. However, the subframe timing includes downlink transmission time from the first base station to the terminal. The terminal obtains TA information on the basis of a time interval T1, carried in the first response signal, for the base station from receiving of the Preamble sequence to sending of the first response signal and a time interval T3 from time, recorded by the terminal, when the corresponding Preamble sequence is started to be sent to the time of arrival of the corresponding Preamble sequence, and at this moment, $$TA = \frac{T3 - T1}{2},$$

as shown in FIG. 11(a). On one hand, the TA information causes the terminal to advance the downlink subframe timing obtained on the basis of the demodulation reference signal by a duration of TA as revised downlink timing, thereby ensuring that the downlink timing of the terminal side is absolutely aligned with downlink timing of a base station side in terms of time without a downlink transmission time error. On the other hand, the TA information also enables the terminal to advance the revised downlink subframe timing by the duration of the TA as uplink subframe timing configured to send the uplink signal.

Furthermore, further downlink synchronization with the high-frequency base station within a larger time range is implemented according to system frame number information and index information of a transmission unit in a radio frame in the first response signal. T1 may be notified on the basis of two layers: the first layer notifies that T1 occupies X1 transmission units with a fixed duration, and the second layer notifies a left duration X2 of T1, namely: TA=X1*$T_{TTI}$+X2, where $T_{TTI}$ represents the duration of the transmission units with the fixed duration. The terminal advances the downlink timing by a time length of the TA as the uplink subframe timing according to the downlink subframe timing shown in FIG. 11(a) and the TA information.

Figure 11B:
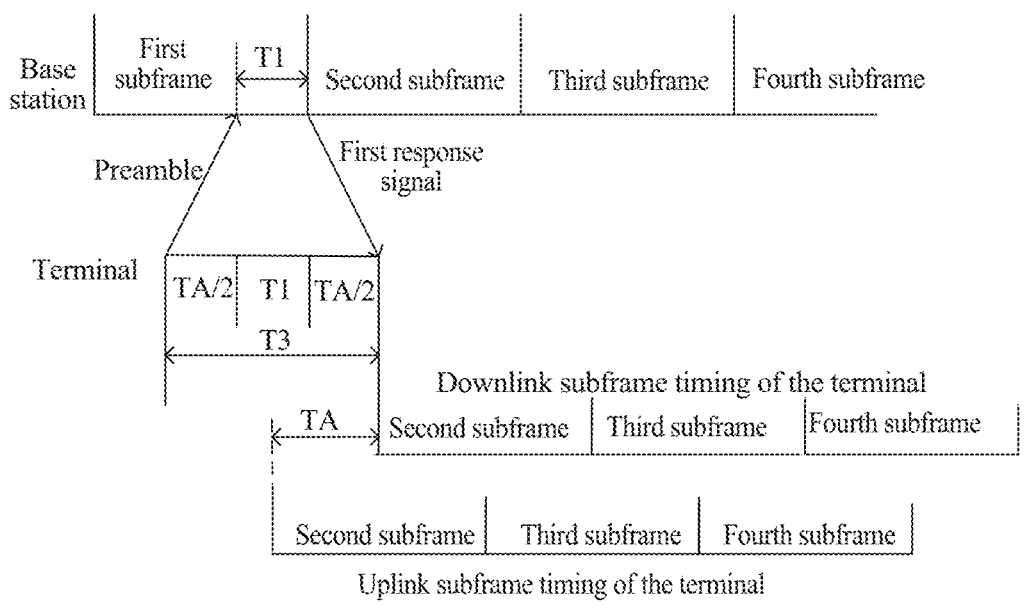
FIG. 11(b) is a schematic diagram of a second embodiment where a terminal acquires uplink subframe timing and downlink subframe timing according to an embodiment of the disclosure.

In another implementation mode of the first embodiment, the downlink subframe timing of the terminal may be obtained only according to the demodulation reference signal, that is, there is a transmission delay between the downlink subframe timing of the terminal side and the downlink timing of the base station side, and TA of the uplink subframe timing of the terminal side relative to own downlink timing of the terminal side is TA=(T3−T1), as shown in FIG. 11(b).

The one or more first base stations in the first embodiment may be located on the same physical base station but have different cell identification numbers or are located at different central carrier frequencies, and the one or more first base stations in the first embodiment may also be located on multiple different physical base stations.

In the embodiment of the disclosure, the one or more first base stations send information related to completion of downlink synchronization and part of system messages only when successfully receiving an uplink access request, may not periodically send the downlink synchronization signals and may also not periodically send part of the system messages. In other words, the one or more first base stations in the embodiment of the disclosure send the synchronization signals and part of the system messages according to a requirement, herein the information related to completion of downlink synchronization includes: the demodulation reference signal taken as the synchronization signal in the first response signal, index information of a transmission unit where the synchronization signal is located in the first response signal and index information carried in the third response signal; and part of the system message includes one or more of the following information: the downlink system bandwidth of the first base station and the uplink system bandwidth allocated to the terminal by the first base station.

For downlink synchronization, in an implementation mode of the first embodiment, the terminal completes the downlink timing with the selected high-frequency base station only through the first response signal, that is, the first response signal carries both of subframe index information of the first response signal in a radio frame number and system frame number information of a radio frame where the first response signal is located.

For downlink synchronization, in a second implementation mode of the first embodiment, the terminal receives the first response signal to only complete the subframe timing with the selected high-frequency base station and completes radio frame timing with the selected high-frequency base station through the third response signal, and at this moment, the first response signal only carries a subframe number where the first response signal is located, and the third response signal carries a system frame number of a radio frame where it is located.

For downlink synchronization, in a third implementation mode of the first embodiment, the terminal receives the first response signal to only complete the subframe timing with the selected high-frequency base station, and at this moment, the first response signal only carries the subframe where the first response signal is located. The third response signal does not early the system frame number of the radio frame where it is located, and the system frame number of the radio frame is obtained through other information, and for example, is obtained by the high-frequency base station through another periodically sent system message. For the other periodically sent system message, the high-frequency base station periodically sends the other system message within predetermined time duration only after the high-frequency base station successfully completes an uplink access process with at least one terminal (that is, at least one terminal resides on the high-frequency base station and is in an activated state); and if the predetermined time duration is exceeded and the high-frequency base station does not successfully complete another uplink access process within the predetermined time duration (that is, there is no at least one terminal residing on the base station and in the activated state at this moment), the high-frequency base station stops periodically sending the other system message.

In a second embodiment, implementation of an uplink access signal sending and receiving process is consistent with the first embodiment, and differences are as follows: in the first embodiment, the Preamble sequence set is notified in 600~601, the terminal selects different Preamble sequences corresponding to each uplink sending beam for sending in 602 and the high-frequency base station sends the corresponding first response signal for each successfully received Preamble in 603; while in the second embodiment, the uplink access configuration information not only notifies the Preamble sequence set but also notifies a grouping manner for the Preamble set sequences in 600~601, each terminal only selects one or more groups of Preamble sequences in 602, the terminal divides the uplink sending beams into multiple groups and sends different groups in a time division manner, the uplink sending beams of the same group being sent on the same time-frequency resource and different sending beams in the group corresponding to different Preamble sequences, and the high-frequency base station sends a first response signal for each Preamble group in 603.

Figure 12:
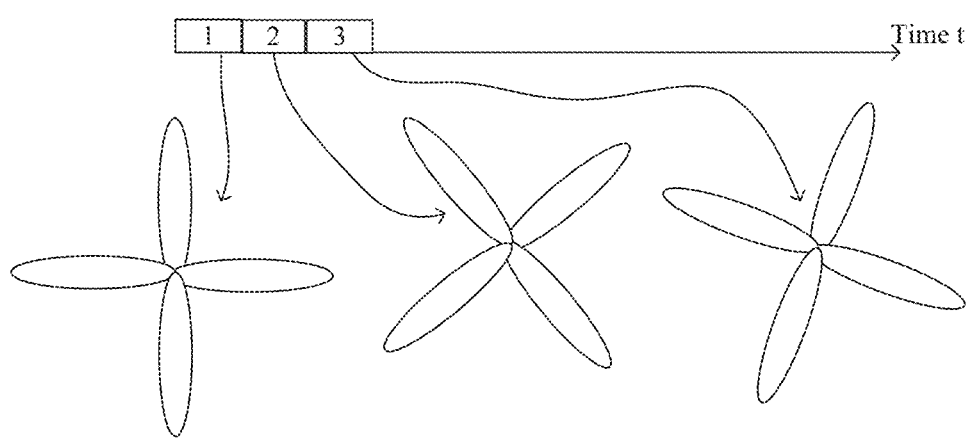
FIG. 12 is a schematic diagram of an embodiment where a terminal groups uplink beams and different groups occupy different sending time according to an embodiment of the disclosure.

For example, in 600~601 of the second embodiment, it is notified that every four Preamble sequence sets are divided into a group, and the terminal sends the uplink sending beams of the first group at a starting location of a transmission unit of the first available time-frequency resource set and then sends the uplink sending beams of the second group at a starting location of another transmission unit of the first available time-frequency resource set. As shown in FIG. 12, the terminal sends the uplink sending beams of different groups in three adjacent high-frequency subframe transmission units. At this moment, the uplink sending beams of different groups sent at different time occupy the Preamble sequences of different groups, that is, all of the uplink sending beams occupy different Preamble sequences. The terminal monitors first response signals of all the sent Preamble groups in the waiting window, and selects one or more optimal uplink sending beams. Then, in 604, the second response signal is sent on the selected optimal uplink sending beams.

In 603 of the second embodiment, the high-frequency base station sends a corresponding first response signal for the same Preamble sequence group of which receiving time is within a certain range, and the first response signal at least carries the following information: the Preamble sequences in this group of Preamble sequences received by the high-frequency base station and reception quality information of each received Preamble sequence. In 604, the terminal selects multiple optimal uplink sending beams on the basis of the reception quality information, sends the second response signal on the multiple selected optimal uplink sending beams and carries information of the uplink sending beams in the second response signal. In 605, the high-frequency base station feeds back sending information of a preferred uplink sending beam in the third response signal on the basis of the uplink sending beams from the same terminal.

Figure 13:
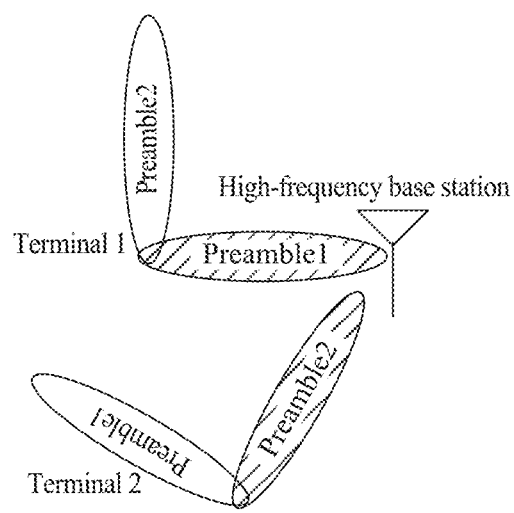
FIG. 13 is a schematic diagram of an embodiment where two terminals select the same Preamble sequence set and optimal uplink beams of the two terminals are different according to an embodiment of the disclosure.

In 605 of the second embodiment, furthermore, for solving the problem of preferred uplink beam misjudgment when only a preferred uplink sending beam notified in 603 is taken as a basis, the method further includes that: the preferred uplink sending beam is notified. As shown in FIG. 13, a terminal 1 and a terminal 2 select the Preamble sequences of the same group, as shown in the slash shadow parts in FIG. 13, an optimal sending beam of the terminal 1 is a sending beam corresponding to a Preamble 1, an optimal sending beam of the terminal 2 is a beam corresponding to a Preamble 2, and time of arrival the uplink beams sent by the two terminals at the high-frequency base station. At this moment, the high-frequency base station feeds back a first response signal to both of the terminal 1 and the terminal 2, reception quality corresponding to the Preamble 1 and Preamble 2 in the first response signal is compared, and there is made such a hypothesis that the reception quality of the Preamble 2 is high. Then, in 601, if selecting only one optimal sending beam, both of the terminal 1 and the terminal 2 may select the sending beam corresponding to the Preamble 2, then only a second response signal of the terminal 2 may arrive at the high-frequency base station and only the terminal 2 may succeed in access. In 604 of the second embodiment, each terminal selects multiple optimal uplink beams for sending and the second response signals carry beam information of each uplink sending beam, as shown in FIG. 13, both of the terminal 1 and the terminal 2 may select the uplink sending beams corresponding to the Preamble 1 and the Preamble 2 for sending and carry the uplink beam information in the second response signals, the high-frequency base station receives the second response signals and notifies the optimal uplink beams of the terminals in the third response signal in 605, and at this moment, the optimal uplink sending beam of the terminal 1 is the uplink sending beam corresponding to the Preamble 1 shown in the shadow part in FIG. 13, and the optimal uplink sending beam of the terminal 2 is the uplink sending beam corresponding to the Preamble 2 shown in the shadow part in FIG. 13. Therefore, relatively accurate selection of the optimal uplink sending beams is also implemented at the same time of completing uplink access.

Figure 14A:
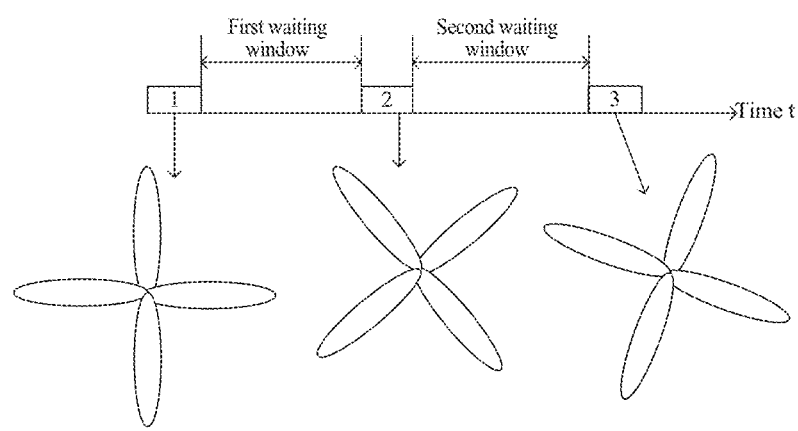
FIG. 14(a) is a schematic diagram of a first embodiment of sending beam directions of a terminal in different groups according to an embodiment of the disclosure.
Figure 14B:
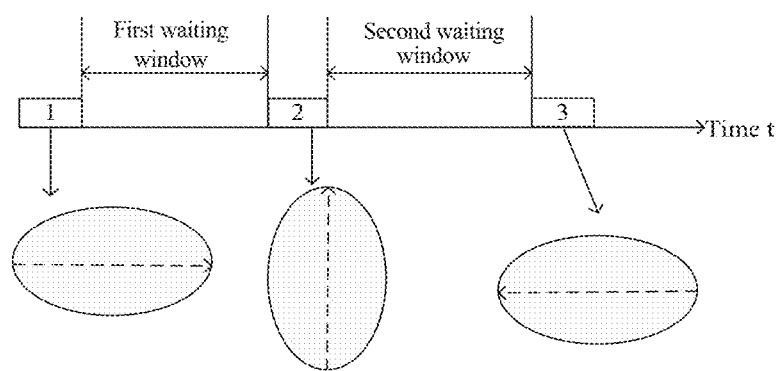
FIG. 14(b) is a schematic diagram of a second embodiment of sending beam directions of a terminal in different groups according to an embodiment of the disclosure.
Figure 14C:
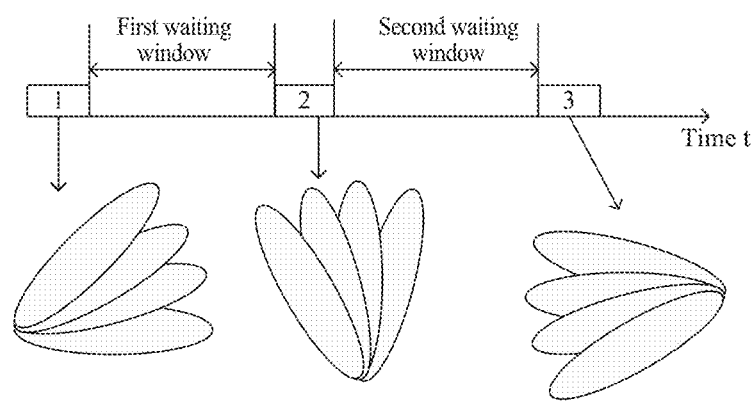
FIG. 14(c) is a schematic diagram of a third embodiment of sending beam directions of a terminal in different groups according to an embodiment of the disclosure.

In another implementation mode of the second embodiment, the terminal may select a group of Preamble sequences and divide the uplink sending beams into multiple groups, and the uplink sending beams of each group share the same Preamble sequence group. At first, the Preambles are sent on the uplink sending beams of the first group, and at this moment, each uplink sending beam corresponds to a different Preamble sequence; then, the waiting window is opened, and in case of successful access in the waiting window, the access process is ended; in case of failed access in the waiting window, the terminal may send the Preamble sequences on the uplink sending beams of the second group after the waiting window is ended, and then opens a second waiting window; in case of successful access in the second waiting window, the access process is ended; in case of failed access in the second waiting window, the terminal sends the Preamble sequences on the uplink sending beams of the third group after the second waiting window is ended, and then opens a third waiting window; and the rest can be done in the same manner, and in case of failed access in all of the uplink sending beam groups, the terminal may start a new round of Preamble sequence sending process on the basis of a manner of power improvement and the like. At this moment, for the terminal, as shown in FIG. 14(a), each group of uplink sending beams includes multiple thin beams at intervals of relatively large direction angles; or, as shown in FIG. 14(b), each group of uplink sending beams includes only one thick beam; or, as shown in FIG. 14(c), each group of uplink sending beams includes multiple thin beams at relatively approximate direction angles.

Figure 15:
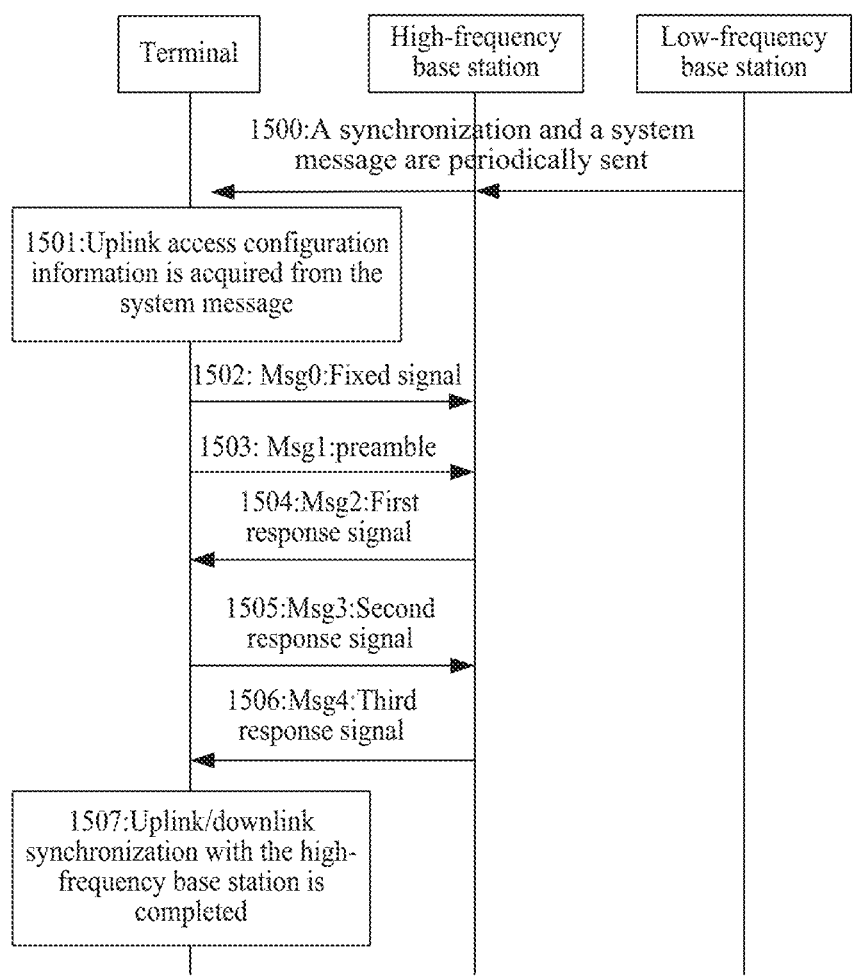
FIG. 15 is a schematic diagram of another embodiment of a network architecture implementing uplink access according to an embodiment of the disclosure.

In the first embodiment and the second embodiment, the high-frequency base station is required to detect each Preamble in the Preamble set sequences in each transmission unit of the first available resource and particularly perform correlation on each Preamble sequence, so that complexity is relatively high. In a third embodiment, the access process is shown in FIG. 15, and differences from the first embodiment and the second embodiment are as follows: the terminal sends a fixed signal before sending the Preamble sequences, the fixed signal being configured for the high-frequency base station to detect the access request of the terminal; and then, the terminal sends the Preamble sequences, herein the fixed signal and the Preamble sequences are all sent in a transmission unit of the first available resource set. Preferably, the fixed signal is a first Preamble sequence, or, is fixedly a longer sequence. Specific implementation of other processes of the third embodiment is the same as the first embodiment or the same as the second embodiment.

In the third example, the high-frequency base station only detects the fixed signal at first in the first available resource set, and if detecting the fixed signal, the high-frequency base station starts detecting all the Preamble sequences; and if the high-frequency base station detects no fixed signal in a transmission unit, the high-frequency base station ends an uplink access receiving process in this transmission unit is ended, and waits for a next transmission unit occupied by a first available resource.

In a manner of sending the fixed signal in the third embodiment, a complex detection process of the high-frequency base station is reduced. That is, the high-frequency base station is not required to detect the Preamble sequences in the Preamble set at each point in a detection window shown in FIG. 9(a)~FIG. 9(b).

In the third embodiment, for preventing the high-frequency base station from missing any uplink access request, successful sending of the fixed signal may be ensured in a manner of relatively high power, a relatively long sequence or the like.

In another implementation mode of the third embodiment, the fixed signal may refer to multiple fixed signals, herein the number of the multiple fixed signals is smaller than the number of the Preamble sequences in the Preamble set.

In another implementation mode of the third embodiment, a random access process is also shown in FIG. 5, but the low-frequency base station may periodically update the number of the Preamble sequences included the Preamble set in an uplink access configuration resource, and for example, continuously updates the number of the Preamble sequences included in the Preamble set in the uplink access configuration resource according to a present load condition. By such processing, detection complexity of the high-frequency base station is reduced.

In a fourth embodiment, if the base station detects a Preamble sequence and establishes an uplink/downlink connection with the terminal, the base station starts timing and periodically sends a downlink synchronization signal or a channel quality measurement signal only within timing time and only on an optimal downlink sending beam fed back by the terminal, and after the timing time, the base station stops periodically sending the downlink synchronization signal or the channel quality measurement signal to the terminal.

In a fifth embodiment, the high-frequency base station only sends the synchronization signal according to a requirement on the basis of the uplink access signal of the terminal and does not send any downlink synchronization signal at other moments, and at this moment, the demodulation reference signal sent by the high-frequency base station and related to a downlink control channel, for example, a Physical Downlink Control Channel (PDCCH), may be configured for downlink synchronization calibration after the terminal is turned on and performs initial uplink access. When a paging message or a system message is required to be modified and there is a terminal in a linked state, the PDCCH related to the system message may be sent in a common search space, and at this moment, the demodulation reference signal configured to demodulate the PDCCH is required to ensure that all beam directions are covered or the demodulation reference signal is only sent on a downlink beam when there is a terminal in the activated state.

Figure 16:
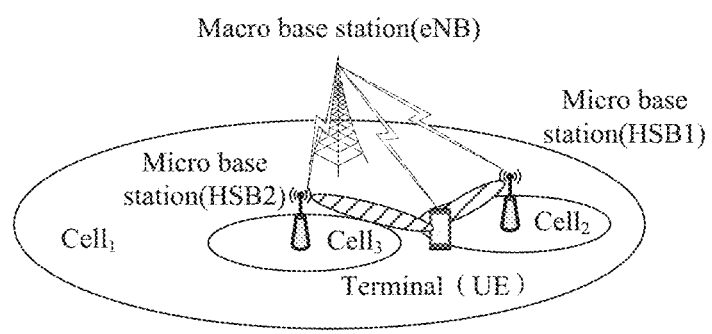
FIG. 16 is a schematic diagram of another embodiment of a network architecture implementing uplink access according to an embodiment of the disclosure.

In a sixth embodiment, there is made such a hypothesis that the one or more first base stations are not high-frequency base stations but low-frequency base stations such as micro base stations. As shown in FIG. 16, there are multiple micro base stations under coverage of a macro base station (i.e., the second base station). At this moment, the micro base stations do not periodically send downlink synchronization signals and part of system broadcast messages but send the downlink synchronization signals and part of the system broadcast messages on the basis of an uplink request of the terminal.

In the sixth embodiment, implementation of an uplink access signal sending and receiving process is consistent with the first embodiment, and the differences are as follows: there is no information related to beam training in an uplink access and downlink synchronization process and a notification manner for the first carrier frequency and the second carrier frequency is also different, specifically as follows.

In 600~601 of the sixth embodiment, one manner is that: the macro base station notifies only one set of uplink access configuration information configured for all the micro base stations and terminals under its coverage. When central carrier frequencies of the micro base stations and the macro base station are the same, the uplink access configuration information may be the same as an existing LTE manner, that is, part of the information is notified in an MIB and an SIB, but a cell identifier set of the one or more first base stations (i.e., the micro base stations) required to be monitored by the terminal is required to be notified for the micro base stations.

When the central carrier frequencies of the micro base stations and the macro base station are different, first carrier frequencies and second carrier frequencies of the micro base stations are required to be notified for the micro base stations. In one manner, the first time-frequency resources and the second time-frequency resources may be unrelated to the central carrier frequencies; and in another manner, they are related to the central carrier frequencies, and if they are related, the first time-frequency resources and the second time-frequency resources are required to be notified for the central carrier frequencies of the micro base stations.

Corresponding to the terminal, the access configuration information includes the following information: an uplink access signal Preamble set; first carrier frequency information for sending an uplink synchronization access signal Preamble; information about second carrier frequency or second carrier frequency set for receiving a first response signal; time-domain and/or frequency-domain resource information of a first available time-frequency resource set for sending the synchronization access signal; time-domain and/or frequency-domain resource information of a second available time-frequency resource set for receiving the first response signal; the cell identifier set of the one or more first base stations required to be monitored by the terminal; target receiving power Target Power-Preamble of a Preamble arriving at the micro base stations; a length of a waiting window for the terminal to wait for the first response signal after sending of a Preamble sequence is ended; and a power improvement step length for sending of the Preamble sequence after the terminal fails to send the Preamble sequence and receives no first response signal.

Corresponding to the micro base stations, the access configuration information includes the following information: the uplink access signal Preamble set required to be monitored; first carrier frequency information corresponding to the uplink synchronization access signal Preamble required to be monitored; the second carrier frequency or second carrier frequency set information for sending first response signals; the time-domain and/or frequency-domain resource information of the first available time-frequency resource set corresponding to the uplink synchronization access signal Preamble required to be monitored; the time-domain and/or frequency-domain resource information of the second available time-frequency resource for sending the first response signals; the target receiving power Target Power-Preamble of the Preamble arriving at the high-frequency base stations; and delay window lengths for the base stations from reception of the Preamble sequence to sending of the first response signals.

In 602 of the sixth embodiment, the terminal sends a Preamble sequence at a starting location of a transmission unit of a first available time-frequency resource, and the Preamble sequence may be randomly selected from the Preamble sequence set.

If the central carrier frequencies of the macro base station and the micro base stations are different, the terminal selects whether to send the Preamble sequence to the macro base station or to send the Preamble sequence to the micro base stations. The Preamble sequence may be sent to the micro base stations with relatively low power at first, and in case of failed access, the Preamble sequence is sent to the macro base station with relatively high power. At this moment, one or more micro base stations under the coverage of the macro base station may detect the Preamble sequence sent by the terminal. When the central carrier frequencies of the macro base station and the micro base stations are the same and the first time-frequency resources and the second time-frequency resources are unrelated to the central carrier frequencies, the Preamble sent by the terminal may also be detected by the macro base station.

In 603 of the sixth embodiment, the first response signal sent by the micro base station carries the following information: related information about that downlink synchronization with the micro base station is completed; cell identification information of the micro base station; related information about the Preamble corresponding to the first response signal sent by the micro base station; a duration T1 for the micro base station from time of arrival of the received Preamble corresponding to the first response signal to starting of sending of the first response signal; reception quality indication information about the Preamble signal received by the micro base station and corresponding to the first response signal; a Temp-CRNTI configured to scramble a subsequent second response signal and scramble a DCI corresponding to a third response signal; a related system message of the micro base station, for example, including a downlink system bandwidth and an uplink system bandwidth, herein, when the uplink system bandwidth forms a one-to-one correspondence with the downlink system bandwidth, only one of them is notified; and an uplink time-frequency resource and coding mode transmission information allocated to the terminal and configured to transmit the second response signal.

When system parameters such as downlink system bandwidths, uplink system bandwidths and PHICH structures of the macro base station and the micro base stations are the same, another implementation mode of the embodiment is that: the following information is not carried in the first response signals: the downlink system bandwidths of the first base stations (i.e., the micro base stations); the uplink system bandwidths allocated to the terminal by the first base stations; and related structural parameters of a MOT The abovementioned information is obtained through a system broadcast message periodically sent by the macro base station. When the system parameters of the macro base station and the micro base stations are different, the abovementioned system broadcast information is required to be carried in the first response signals.

Demodulation reference signals in the first response signals from different micro base stations correspond to cell identification information of the one or more micro base stations, and at this moment, the terminal obtains the cell identification information according to the demodulation reference signals. Each micro base station omnidirectionally sends a first response signal on all beams.

In 603, when the carrier frequencies of the macro base station and the micro base stations are the same, the terminal may detect a first response signal of the macro base station at first, and at this moment, the first response signal of the macro base station is the same as existing LTE, and namely carries the following information:

the related information about the Preamble sequence corresponding to the first response signals sent by the first base stations and TA, sent to the terminal by the first base stations, of a downlink subframe of the terminal relative to an uplink subframe; and at this moment, the terminal also detects the first response signals of the micro base stations, and the terminal selects one base station for uplink access according to reception quality (i.e., downlink quality information) of the first response signals received by the terminal from different base stations including the micro base stations and the macro base station and reception quality information (i.e., uplink quality information), carried in the first response signals received by the terminal from the micro base stations, of the Preamble sequences received by the micro base stations.

In 604, when the base station of the terminal is a micro base station, the terminal sends the second response signal to the selected micro base station, the second response signal at least carrying the following information: cell identification information of the selected base station and identification information of the terminal.

If the terminal selects the macro base station, the second response signal at least carries the following information: the identification information of the terminal.

The micro base station receives the second response signal, the micro base station recognizes whether the cell identification information carried in the second response signal is the same as its cell identification information or not, if YES, the micro base station determines whether to allow access of the terminal or not, and if access of the terminal is allowed, the micro base station is prepared to send a third response signal to the terminal. If there is no cell identification information in the second response signal received by the micro base station, the micro base station ignores the second response signal.

In 605 of the sixth embodiment, the micro base station allowing access sends the third response signal to the terminal, the third response signal at least carrying the following information: related indication information about that the terminal completes sending and receiving signals associated with uplink access and downlink synchronization with the selected micro base station and the identification information of the terminal; and the terminal detects the third response signal from the selected micro base station, and if the terminal successfully detects the third response signal and the identification information, carried in the third response signal, of the terminal is the same as the terminal, the terminal completes sending and receiving of related signals of the uplink access process with the selected micro base station. The terminal completes downlink synchronization with the selected micro base station at the same time of completing uplink access, and acquires part of necessary system broadcast messages.

If the terminal selects to send the second response signal to the macro base station in 603, the terminal detects the third response signal sent by the macro base station in 605, the third response signal sent by the macro base station carrying the following information: the identification information of the terminal.

In the sixth embodiment, the multiple micro base stations under the coverage of the macro base station are included, the macro base station periodically sends a synchronization signals and the system broadcast message, and the micro base stations send downlink synchronization or part of the system messages on the basis of the request of the terminal. There are two conditions in the embodiment.

The central carrier frequencies of the macro base station and the micro base stations are the same, and at this moment, the terminal selects a base station to complete uplink access and uncompleted downlink access by comprehensively considering the downlink reception quality of the first response signals and the uplink reception quality, carried in the first response signals, of the micro base stations; and at this moment, the terminal may select a micro base station and may also select the macro base station.

The central carrier frequencies of the macro base station and the micro base stations are different, and at this moment, the terminal selects whether to send the Preamble to the macro base station or the micro base stations. At this moment, the terminal may further determine whether to send the Preamble to the macro base station or to send the Preamble to the micro base stations according to downlink signal reception quality of the macro base station.

By the sixth embodiment, the terminal may determine the base station more suitable for access in a macro-micro cell network structure more adaptively.

In a seventh embodiment, an uplink access process is the same as the first embodiment or the second embodiment, and the difference is that part of the system messages are not carried in the first response signal but carried in the third response signal. In the embodiment, the first base station and the terminal perform base station selection and uplink and downlink beam training in 600~604 at first, and part of the system broadcast messages are carried in the third response signal, herein the part of the system broadcast message includes the following information: the downlink system bandwidth of the first base station; the uplink system bandwidth allocated to the terminal by the first base station; and the related structural parameter of the PHICH. In the seventh embodiment, the abovementioned information is not carried in the first response signal but carried in the third response signal.

In the embodiment, a third time-frequency resource and a fourth time-frequency resource are required to be notified in the uplink access configuration, herein the third time-frequency resource is configured for the terminal to send the second response signal, and the base station monitors the second response signal on the resource. The third time-frequency resource is configured for the base station to send the third response signal, and the terminal monitors the third response signal on the resource.

In such a manner, when the first response signal is sent, on one hand, the high-frequency base station is required to send part of the system broadcast message on all the downlink beams, so that sending power of the high-frequency base station is reduced. On the other hand, after the base station sends the first response signal, the terminal may not select the base station as a subsequent access base station. By the seventh embodiment, after the high-frequency base station and the terminal determine access and a beam training process has been completed, the high-frequency base station only sends part of the system broadcast message on the preferred downlink beam, and the terminal also only monitors the third response signal on the preferred downlink beam of the selected high-frequency base station, so that power at which the high-frequency base station sends the first response signal and detection complexity of the terminal over the first response signal are effectively reduced.

In an eighth embodiment, after the terminal is turned on and completes uplink access and downlink synchronization with the high-frequency base station by virtue of the first embodiment of the second example, the terminal performs uplink and downlink beam training on the basis of the demodulation reference signal sent by the high-frequency base station and configured to demodulate the downlink control channel (or performing uplink and downlink beam training in another manner) to obtain the preferred downlink beam and the preferred uplink beam; and during next uplink access with the high-frequency base station, the terminal only sends an uplink access request signal on the preferred uplink beam and monitors the first response signal on the preferred downlink beam. At this moment, uplink access request signals may be divided into two sets, the uplink access request signals in the first set are configured for a terminal which has not completed beam training with the base station before uplink access, and the uplink access request signals in the second set are configured for a terminal which has completed beam training with the base station before uplink access.

The base station monitors uplink access request signals on all uplink receiving beams, and after the base station successfully detects an uplink access request signal, judges the set where the uplink access request signal is located, and when the uplink access request signal belongs to the first set, the base station sends the first response signal on all the downlink sending beams; and when the uplink access request signal belongs to the second set, the base station sends the first response signal only on the downlink beam presently with a terminal, herein the beam presently with a terminal refers to that the base station starts timing after the preferred downlink beam fed back by the terminal in a beam training stage (or another stage) and, timing is not exceeded, it is indicated that there is a terminal on the downlink beam.

In a ninth embodiment, uplink access request signals are divided into two sets, and after successfully detecting an uplink access request signal in the first set, the base station carries the information related to downlink synchronization and part of the system message in the first response signal. After successfully detecting an uplink access request signal in the second set, the base station does not carry the information related to downlink synchronization in the first response signal and does not carry part of the system message in the first response signal or the third response signal, and at this moment, the terminal has completed downlink synchronization with the high-frequency base station before uplink access of this time and has acquired part of the system message, herein the part of the system message includes: the downlink system bandwidth of the base station; the uplink system bandwidth allocated to the terminal by the base station; and the related structural parameter of the NECK In a tenth embodiment, its process is similar to the first embodiment, and the difference is as follows: the terminal makes an uplink access request to access the low-frequency base station to obtain a C-RNTI before sending the access request, then the low-frequency base station may send the uplink access configuration information through dedicated dynamic control information or dedicated high-layer control information, at this moment, the low-frequency base station may send the dedicated uplink access configuration information of the terminal or the dedicated uplink access configuration information of the high-frequency base stations to the terminal on the basis of a location of the terminal and locations of the high-frequency base stations, and the terminal processes of uplink access, downlink synchronization and the like similar to the first embodiment on the basis of the uplink access configuration information. In another implementation mode of the embodiment, the terminal may also acquire C-RNTI information in another manner, and may monitor the dedicated uplink access configuration information sent by the base station after acquiring the C-RNTI information, and the terminal performs the processes of uplink access, downlink synchronization and the like similar to the first embodiment on the basis of the uplink access configuration information.

The two pieces of dedicated uplink access configuration information may be sent by scheduling of the base station and may also be sent on the basis of a request of the terminal.

The above is only the preferred embodiment of the disclosure and not intended to limit the scope of protection of the disclosure. Any modifications, equivalent replacements, improvements and the like made within the spirit and principle of the disclosure shall fall within the scope of protection of the disclosure.

INDUSTRIAL APPLICABILITY

The uplink access method and device, terminal and base station disclosed by the embodiments of the disclosure include that: the terminal requests the one or more first base stations for uplink access according to the obtained uplink access configuration information; the uplink access related information returned from the one or more first base stations is received, the uplink access related information including the downlink synchronization related information for downlink synchronization; and the first base station for uplink access is selected according to the received uplink access related information from among the one or more first base stations. By the technical solutions provided by the disclosure, the terminal may complete downlink synchronization with one or more selected first base stations at the same time of completing uplink access and obtain part of the system message of the accessed first base station. In such a manner, the one or more first base stations are not required to periodically send the synchronization signals and part of the system messages, so that system power consumption brought by sending of a synchronization signal and a system broadcast message is greatly reduced, and system resources are saved.

The invention claimed is:

1. An uplink access method, comprising: requesting, by a terminal, one or more first base stations for uplink access according to obtained uplink access configuration information;
   receiving uplink access related information returned from the one or more first base stations, the uplink access related information comprising downlink synchronization related information for downlink synchronization; and
   selecting a first base station for uplink access from among the one or more first base stations according to the received uplink access related information,
   wherein when the terminal does not complete downlink synchronization with the first base station returning the uplink access related information according to the downlink synchronization related information in the returned uplink access related information, further comprising: completing, by the terminal, downlink synchronization with the selected first base station.

2. The uplink access method according to claim 1, further comprising: before requesting, by the terminal, the one or more first base stations for uplink access according to the obtained uplink access configuration information,
   obtaining, by the terminal, the uplink access configuration information according to a system broadcast message from a second base station; or
   obtaining, by the terminal, the uplink access configuration information according to high-layer configuration information from the second base station.

3. The uplink access method according to claim 1, wherein the uplink access configuration information comprises one or more of the following information:
   a first uplink access signal sequence set;
   information about first uplink access signal sequence group;
   information about second uplink access signal sequence group;
   information about first carrier frequency for sending an uplink access request signal;
   information about second carrier frequency or second carrier frequency set for receiving a first response signal;
   time-domain resource information and/or frequency-domain resource information of a first available time-frequency resource set;
   time-domain resource information and/or frequency-domain resource information of a second available time-frequency resource set; and
   a cell identifier set of one or more first base stations required to be monitored by the terminal.

4. The uplink access method according to claim 3, wherein requesting, by the terminal, the one or more first base stations for uplink access according to the obtained uplink access configuration information comprises:

sending, by the terminal, the uplink access request signal to one or more first base stations on one or more first time-frequency resources of the first available time-frequency resource set.

5. The uplink access method according to claim 3, wherein receiving the uplink access related information returned from the one or more first base stations comprises:
   detecting, by the terminal on one or more second time-frequency resources of the second available time-frequency resource set, one or more first response signals, sent by the one or more first base stations, carrying the uplink access related information,
   wherein the first response signal has a specific structure on the second time-frequency resource.

6. The uplink access method according to claim 5, wherein the first response signal carries one or more of the following information:
   cell identification information of the first base station;
   related information of an uplink access request signal group corresponding to the first response signal sent by the first base station;
   information related to a preferred uplink sending beam from the terminal to the first base station;
   a duration T1 from time of arrival of the uplink access request signals corresponding to the first response signal to starting of sending of the first response signal;
   a difference value between the duration T1 from the time of arrival of the uplink access request signals corresponding to the first response signal to starting of sending of the first response signal and a predetermined duration T4;
   a corresponding duration T1 for each uplink access request signal in the group of uplink access request signals corresponding to the first response signal;
   one duration T1 for the group of uplink access request signals corresponding to the first response signal;
   reception quality indication information of the uplink access request signals corresponding to the first response signal sent by the first base station;
   a downlink system bandwidth of the first base station;
   an uplink system bandwidth allocated to the terminal by the first base station;
   downlink sending beam information of the first base station; and
   a related structural parameter of a Physical Hybrid Automatic Repeat Request (ARQ) Indicator Channel (PHICH).

7. The uplink access method according to claim 5, wherein the first response signal at least comprises a demodulation reference signal part,
   wherein a pattern relationship between a time-frequency resource occupied by a DCI and a time-frequency resource occupied by the demodulation reference signal on the second time-frequency resource is agreed upon in advance by the first base station and the terminal; and
   the time-frequency resource occupied by the demodulation reference signal on the second time-frequency resource is agreed upon in advance by the first base station and the terminal.

8. The uplink access method according to claim 5, wherein the first response signal at least comprises a demodulation reference signal part,
   wherein when demodulation reference signals in the first response signals from different first base stations are in one-to-one correspondence with the cell identification information of the one or more first base stations, the terminal obtains the cell identification information according to the demodulation reference signals; or
   when the demodulation reference signals in the first response signals from different first base stations form a one-to-one correspondence with the cell identification information of the one or more first base stations and downlink sending beams of the first base stations, the terminal obtains the cell identification information and the downlink sending beam information according to the demodulation reference signals.

9. The uplink access method according to claim 5, further comprising:
   obtaining, by the terminal, a starting location of a transmission unit where the first response signal is located according to the demodulation reference signal in the first response signal received from the first base station,
   wherein a time domain of the transmission unit is equal to a time-domain length corresponding to a minimum resource scheduling unit, and a frequency domain of the transmission unit corresponds to an overall system bandwidth.

10. The uplink access method according to claim 9, further comprising:
   completing, by the terminal, downlink synchronization with the first base station within a larger time range according to index information, carried in the first response signal, of the transmission unit where the first response signal is located in longer time.

11. The uplink access method according to claim 5, wherein selecting the first base station for uplink access from among the one or more first base stations according to the received uplink access related information comprises:
   selecting, by the terminal, the first base station for uplink access from among one or more first base stations from which the first response signals are successfully received; and
   obtaining, by the terminal, downlink timing with the first base station for uplink access according to the first response signal sent by the selected first base station, obtaining information about a Time Advance (TA) of starting time of an uplink transmission unit to the selected first base station relative to a corresponding downlink transmission unit, obtaining information about a preferred uplink sending beam arriving at the selected first base station and obtaining information about a preferred downlink beam from the selected first base station to the terminal.

12. The uplink access method according to claim 11, further comprising: sending, by the terminal, a second response signal to the selected first base station on one or more uplink sending beams, wherein the one or more uplink sending beams are obtained on the basis of the information about the preferred uplink sending beam carried in the first response signal sent by the selected first base station; and
   monitoring, by the terminal, a third response signal sent by the selected first base station on the preferred downlink beam, wherein the preferred downlink beam is obtained according to the first response signal of the selected first base station, and is fed back to the selected first base station in the second response signal.

13. The uplink access method according to claim 12, wherein the second response signal carries one or more of the following information:
   cell identification information of the selected first base station;
   the information about the preferred downlink sending beam from the selected first base station to the terminal;

identification information of the terminal; and information about the uplink sending beam by which the terminal sends the second response signal.

14. The uplink access method according to claim 12, wherein the third response signal carries one or more of the following information:

related indication information indicating completion of sending and receiving signals associated with uplink access and downlink synchronization between the terminal and the selected first base station;

the identification information of the terminal;

the information about the preferred uplink sending beam from the terminal to the selected first base station;

index information of a first time unit where the third response signal is located in a second time unit;

a downlink system bandwidth of the first base station;

an uplink system bandwidth allocated to the terminal by the first base station; and a related structural parameter of a PHICH.

15. The uplink access method according to claim 12, further comprising: after successfully receiving, by the terminal, the third response signal sent by the selected first base station, receiving, by the terminal, second uplink access configuration information from the selected first base station as uplink access configuration information configured for a next uplink access of the terminal to the selected first base station.

16. The uplink access method according to claim 12, further comprising: after successfully receiving, by the terminal, the third response signal sent by the selected first base station, receiving third uplink access configuration information from the selected first base station as uplink access configuration information configured for an uplink access of the terminal to a fourth base station.

17. The uplink access method according to claim 16, wherein the selected first base station sends the third uplink access configuration information through a downlink data channel or a system message.

18. An uplink access method, comprising:

receiving, by one or more first base stations, an uplink access request from a terminal, and feeding back uplink access related information used by the terminal to the terminal, the uplink access related information comprising downlink synchronization related information for downlink synchronization; and implementing, by a selected first base station in the one or more first base stations, uplink access with the terminal.

19. An uplink access device, comprising:

a memory storing processor-executable instructions; and a processor arranged to execute the stored processor-executable instructions to perform steps of:

requesting one or more first base stations for uplink access according to obtained uplink access configuration information and receiving uplink access related information returned from the one or more first base stations, the uplink access related information comprising downlink synchronization related information for downlink synchronization; and selecting a first base station for uplink access from among the one or more first base stations according to the received uplink access related information, wherein when the terminal does not complete downlink synchronization with the first base station returning the uplink access related information according to the downlink synchronization related information in the returned uplink access related information, further comprising: completing, by the terminal, downlink synchronization with the selected first base station.

* * * * *